United States Patent
Robinson et al.

(10) Patent No.: US 11,109,014 B2
(45) Date of Patent: Aug. 31, 2021

(54) PRIVACY DISPLAY APPARATUS

(71) Applicant: RealD Spark, LLC, Beverly Hills, CA (US)

(72) Inventors: Michael G. Robinson, Boulder, CO (US); Graham J. Woodgate, Henley on Thames (GB); Jonathan Harrold, Leamington Spa (GB); Robert A Ramsey, Boulder, CO (US); Ben Ihas, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/760,412

(22) PCT Filed: Nov. 5, 2018

(86) PCT No.: PCT/US2018/059249
§ 371 (c)(1),
(2) Date: Apr. 29, 2020

(87) PCT Pub. No.: WO2019/090246
PCT Pub. Date: May 9, 2019

(65) Prior Publication Data
US 2020/0333645 A1 Oct. 22, 2020

Related U.S. Application Data

(60) Provisional application No. 62/582,030, filed on Nov. 6, 2017.

(51) Int. Cl.
*G02F 1/13363* (2006.01)
*H04N 13/30* (2018.01)
(Continued)

(52) U.S. Cl.
CPC ........... *H04N 13/30* (2018.05); *G02B 6/0048* (2013.01); *G02B 6/0068* (2013.01); *G02F 1/13* (2013.01);
(Continued)

(58) Field of Classification Search
None
See application file for complete search history.

(56) References Cited

U.S. PATENT DOCUMENTS 4,621,898 A   11/1986 Cohen
4,974,941 A   12/1990 Gibbons et al.
(Continued)

FOREIGN PATENT DOCUMENTS

CA   2222313 A1   6/1998
CN   1125943 C    10/2003
(Continued)

OTHER PUBLICATIONS

PCT/US2020/060155 International search report and written opinion of the international searching authority dated Feb. 5, 2021.
(Continued)

*Primary Examiner* — James A Dudek
(74) *Attorney, Agent, or Firm* — Penny L. Lowry

(57) ABSTRACT

A privacy display comprises a liquid crystal spatial light modulator, a switchable retarder and a passive compensation retarder arranged between a pair of polarisers. In a privacy mode of operation, on-axis light from the spatial light modulator is directed without change of image contrast, whereas off-axis light has reduced contrast to reduce the visibility of the display to off-axis snoopers over a wide polar angular range. In a wide angle mode of operation, the retardance of the switchable retarder is adjusted so that off-axis contrast is substantially unmodified.

20 Claims, 36 Drawing Sheets

(51) Int. Cl.

| | | |
|---|---|---|
| *F21V 8/00* | (2006.01) | |
| *G02F 1/295* | (2006.01) | |
| *G02F 1/365* | (2006.01) | |
| *G02F 1/1335* | (2006.01) | |
| *G02F 1/13* | (2006.01) | |
| *G02F 1/1337* | (2006.01) | |
| *G02F 1/137* | (2006.01) | |
| *G02F 1/13357* | (2006.01) | |
| *G02F 1/1347* | (2006.01) | |

(52) U.S. Cl.
CPC .......... *G02F 1/137* (2013.01); *G02F 1/1323* (2013.01); *G02F 1/1337* (2013.01); *G02F 1/1347* (2013.01); *G02F 1/13363* (2013.01); *G02F 1/133524* (2013.01); *G02F 1/133528* (2013.01); *G02F 1/133536* (2013.01); *G02F 1/133615* (2013.01); *G02F 1/133753* (2013.01); *G02F 1/295* (2013.01); *G02F 1/365* (2013.01); *G02B 6/0011* (2013.01); *G02F 1/13478* (2021.01); *G02F 1/13706* (2021.01); *G02F 1/13712* (2021.01); *G02F 1/133562* (2021.01); *G02F 1/133567* (2021.01); *G02F 1/133638* (2021.01); *G02F 1/133738* (2021.01); *G02F 1/133742* (2021.01); *G02F 2203/12* (2013.01); *H04N 2013/403* (2018.05)

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,658,490 A * | 8/1997 | Sharp .............. G02F 1/13363 252/299.01 |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 5,914,760 A | 6/1999 | Daiku |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0066785 A1 | 3/2006 | Moriya |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 * | 8/2009 | Ohmuro .......... G02F 1/133634 349/96 |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |

(56) References Cited

U.S. PATENT DOCUMENTS

| | | |
|---|---|---|
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1* | 12/2013 | Woodgate ............. G02B 30/26 345/419 |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshaysky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346125 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 1776484 A | 5/2006 |
| CN | 101681061 A | 3/2010 |
| CN | 104133292 A | 11/2014 |
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120011228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

PCT/US2020/060191 International search report and written opinion of the international searching authority dated Feb. 8, 2021.

Robson, et al. "Spatial and temporal contrast-sensitivity functions of the visual system", J. Opt. Soc. Amer., vol. 56, pp. 1141-1142 (1966).

Adachi, et al. "P-228L: Late-News Poster: Controllable Viewing-Angle Displays using a Hybrid Aligned Nematic Liquid Crystal Cell", ISSN, SID 2006 Digest, pp. 705-708.

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.

CN201780030715.3 Notification of the First Office Action dated Jan. 21, 2020.

EP-16860628.3 Extended European Search Report of European Patent Office dated Apr. 26, 2019.

(56) References Cited

OTHER PUBLICATIONS

EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.
PCT/US2020/053863 International search report and written opinion of the international searching authority dated Mar. 12, 2021.
PCT/US2020/063638 International search report and written opinion of the international searching authority dated Mar. 2, 2021.
PCT/US2020/064633 International search report and written opinion of the international searching authority dated Mar. 15, 2021.
Simonyan et al., "Very Deep Convolutional Networks For Large-Scale Image Recognition", ICLR 2015.

* cited by examiner ic PRIVACY DISPLAY APPARATUS

TECHNICAL FIELD

This disclosure generally relates to illumination from light modulation devices, and more specifically relates to switchable optical stacks for providing control of display contrast for use in display including privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is herein incorporated by reference in its entirety.

BRIEF SUMMARY

According to the present disclosure, there is provided a display device comprising: a spatial light modulator comprising a layer of liquid crystal material arranged to output light on an output side; an input polariser arranged on an input side of the spatial light modulator; an output polariser arranged on the output side of the spatial light modulator; and plural retarders arranged between the input polariser and the output polariser on either the input side or the output side of spatial light modulator, wherein the plural retarders include at least one switchable liquid crystal retarder comprising a layer of liquid crystal material and electrodes arranged to apply a voltage for switching the layer of liquid crystal material, and at least one passive retarder, and the plural retarders are arranged to introduce no phase shift to polarisation components of light passed by the input polariser along an axis along a normal to the plane of the retarder and are arranged to introduce a phase shift to polarisation components of light passed by the input polariser along an axis inclined to the axis along a normal to the plane of the retarder in a switchable mode of the at least one switchable liquid crystal retarder.

Advantageously a display device may be provided that is switchable between a first public mode of operation for use by multiple users and a privacy mode to achieve increased visual security for off-axis snoopers and high image visibility to an on-axis user. In privacy mode, image contrast may vary with viewing angle. The polar angular range over which high visual security level to the snooper may be increased in comparison to arrangements with no passive retarder.

The switchable liquid crystal retarder may comprise two surface alignment layers disposed adjacent to the layer of liquid crystal material and on opposite sides thereof and each arranged to provide homeotropic alignment in the adjacent liquid crystal material. The liquid crystal material may have a negative dielectric anisotropy. The at least one passive retarder may comprise a passive retarder having an optical axis perpendicular to the plane of the passive retarder and having and having a retardance for light of a wavelength of 550 nm in a range from −250 nm to −500 nm. Advantageously the polar range for high visual security level may be increased for off-axis snoopers with low elevation angles.

The switchable liquid crystal retarder may comprise two surface alignment layers disposed adjacent to the layer of liquid crystal material and on opposite sides thereof and each arranged to provide homogenous alignment in the adjacent liquid crystal material. The liquid crystal material may have a positive dielectric anisotropy. The at least one passive retarder may comprise a passive retarder having an optical axis perpendicular to the plane of the passive retarder and having and having a retardance for light of a wavelength of 550 nm in a range from −400 nm to −200 nm.

The at least one passive retarder may comprise a pair of passive retarders having optical axes parallel to the plane of the passive retarder that are crossed and having a retardance for light of a wavelength of 550 nm in a range from 250 nm to 450 nm.

Advantageously the polar range for high visual security level may be increased for off-axis snoopers with high elevation angles.

The spatial light modulator may comprise a surface alignment layer disposed adjacent to the layer of liquid crystal material on the side closest to the plural retarders that is arranged to provide homogenous alignment in the adjacent liquid crystal material, there being a non-zero angle between the alignment direction of the surface alignment layer of the spatial light modulator and the alignment direction of the surface alignment layer of the switchable liquid crystal retarder on the side closest to the spatial light modulator, and the display device further comprises a half waveplate arranged between the spatial light modulator and the switchable liquid crystal retarder and arranged to rotate a polarisation component of light incident thereon by said non-zero angle. The at least one passive retarder may comprise a passive retarder having an optical axis perpendicular to the plane of the passive retarder and having and having a retardance for light of a wavelength of 550 nm in a range from −375 nm to −225 nm.

Advantageously the display may be arranged to operate with liquid crystal display modes that have inclined polariser transmission directions such as twisted nematic LCDs, achieving reduced display cost.

The at least one passive retarder may comprise a pair of passive retarders having optical axes parallel to the plane of the passive retarder that are crossed. Advantageously the retarders may be provided at low cost.

The pair of passive retarders may have optical axes that extend at 45° and at 135°, respectively, with respect to an electric vector transmission direction of the input polariser or the output polariser. Advantageously the contrast may be reduced in viewing quadrants of the display.

The at least one passive retarder may comprise a passive retarder having an optical axis perpendicular to the plane of the passive retarder. Advantageously the number of retarder elements may be reduced and the thickness of the display reduced, The spatial light modulator may be transmissive and the display device may further comprise a backlight on the input side of the input polariser. The spatial light modulator may be one of an in-plane switching device, a twisted nematic device or a fringe field switching device. Advantageously high image quality may be achieved in public mode of operation with a wide range of viewing angles at high contrast.

The backlight may provide a luminance at lateral angles greater than 45 degrees, that is at most 20%, preferably at most 15% and most preferably at most 10% of the luminance in a direction normal to the display surface. The luminance reduction may cooperate with the contrast reduction. Advantageously the display may provide increased visual security level in comparison to displays with higher luminance at off-axis angles.

The display device may further comprise an additional polariser arranged on the input side of the input polariser or on the output side of the output polariser; and at least one retarder arranged between the input polariser and the additional polariser in the case the additional polariser is arranged on the input side of the input polariser; or at least one retarder arranged between the output polariser and the additional polariser in the case the additional polariser is arranged on the output side of the output polariser.

The at least one retarder may comprise a switchable liquid crystal retarder comprising a layer of liquid crystal material. Advantageously the display may achieve a wide luminance viewing angle in public mode and reduced luminance viewing angle in privacy mode. High image visibility may be provided for off-axis viewers in public mode and increased visual security level achieved for off-axis snoopers in privacy mode.

The display device may further comprise at least one passive compensation retarder between the display polariser and additional polariser. Advantageously the luminance reduction may be provided over a wide polar field of view in privacy mode of operation, increasing the visual security level.

The additional polariser may be on the output side of the output polariser and further comprise a reflective polariser arranged between the output polariser and the at least one retarder. The reflectivity of the display may be increased in privacy mode, achieving increased visual security level for off-axis observers. The display may have low reflectivity in public mode of operation.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
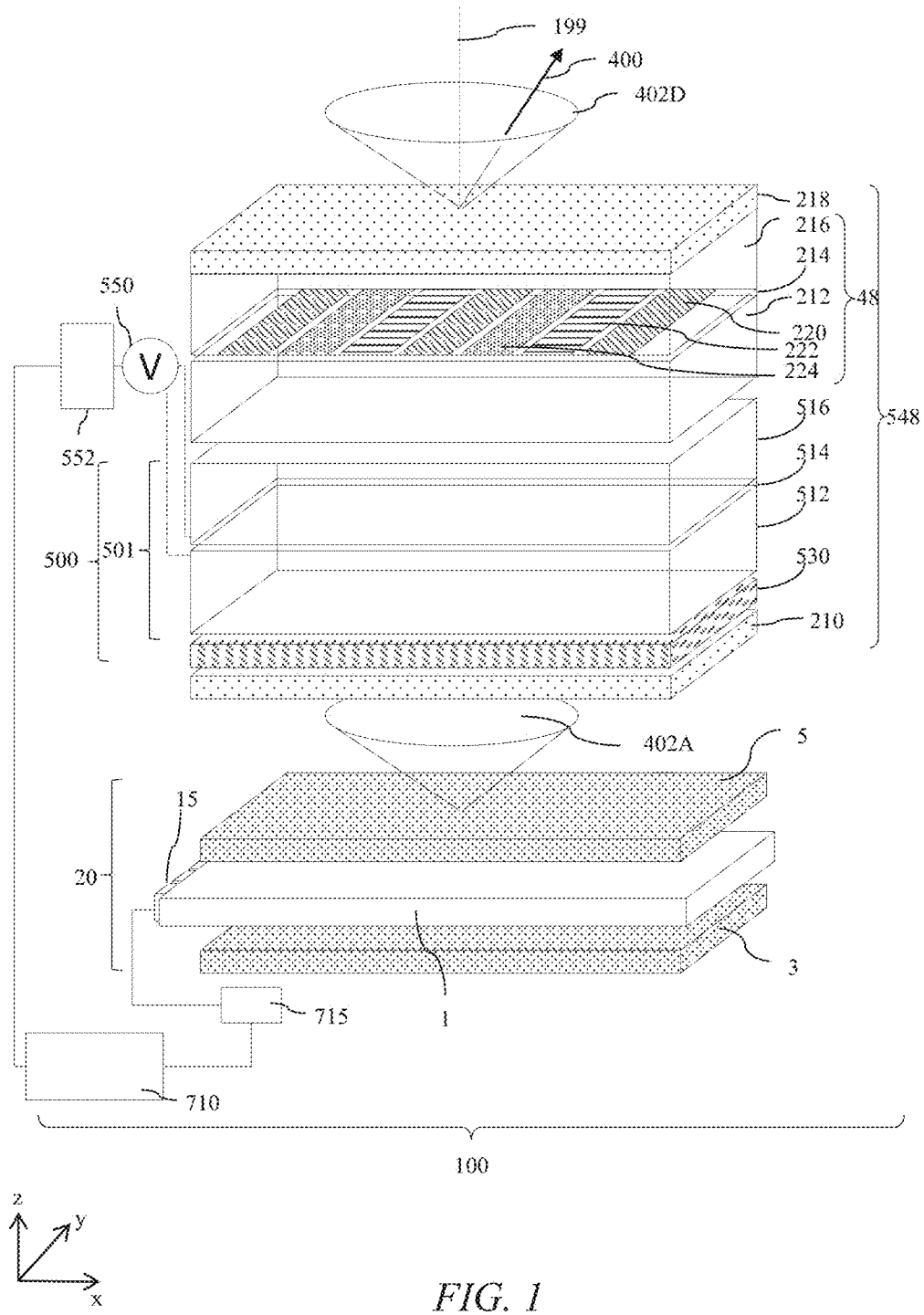
FIG. 1 is a schematic diagram illustrating in side perspective view a switchable privacy display comprising a transmissive spatial light modulator, a switchable retarder and a passive compensation retarder arranged between crossed polarisers.

Terms related to optical retarders for the purposes of the present disclosure will now be described.

In a layer comprising a uniaxial birefringent material there is a direction governing the optical anisotropy whereas all directions perpendicular to it (or at a given angle to it) have equivalent birefringence.

The optical axis of an optical retarder refers to the direction of propagation of a light ray in the uniaxial birefringent material in which no birefringence is experienced. This is different from the optical axis of an optical system which may for example be parallel to a line of symmetry or normal to a display surface along which a principal ray propagates.

For light propagating in a direction orthogonal to the optical axis, the optical axis is the slow axis when linearly polarized light with an electric vector direction parallel to the slow axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 318 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by $$\Gamma = 2 \cdot \pi \cdot \Delta n \cdot d / \lambda_0 \qquad \text{eqn. 1}$$

In eqn. 1, $\Delta n$ is defined as the difference between the extraordinary and the ordinary index of refraction, i.e.

$$\Delta n = n_e - n_o \qquad \text{eqn. 2}$$

For a half wave retarder, the relationship between d, $\Delta n$, and $\lambda_0$ is chosen so that the phase shift between polarization components is $\Gamma = \pi$. For a quarter wave retarder, the relationship between d, $\Delta n$, and $\lambda_0$ is chosen so that the phase shift between polarization components is $\Gamma = \pi/2$.

The term half wave retarder herein typically refers to light propagating normal to the retarder and normal to the spatial light modulator.

In the present disclosure an 'A-plate' refers to an optical retarder utilizing a layer of birefringent material with its optical axis parallel to the plane of the layer.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to positively birefringent C-plate, i.e. a C-plate with a positive $\Delta n$. A 'negative C-plate' refers to a negatively birefringent C-plate, i.e. a C-plate with a negative $\Delta n$.

'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as $$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in equation 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic like liquid crystal molecules.

Parallel liquid crystal cell alignment refers to the alignment direction of homogeneous alignment layers being parallel or more typically antiparallel. In the case of pre-tilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

A private mode of operation of a display is one in which an observer sees a low contrast sensitivity such that an image is not clearly visible. Contrast sensitivity is a measure of the ability to discern between luminances of different levels in a static image. Inverse contrast sensitivity may be used as a measure of visual security, in that a high visual security level (VSL) corresponds to low image visibility.

For a privacy display providing an image to an observer, visual security may be given as:

$$VSL=(Y+R)/(Y-K) \qquad \text{eqn. 4}$$

where VSL is the visual security level, Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 5}$$

For high contrast optical LCD modes, the white state transmission remains substantially constant with viewing angle. In the contrast reducing liquid crystal modes of the present embodiments, white state transmission typically reduces as black state transmission increases such that $$Y+K \sim P \cdot L \qquad \text{eqn. 6}$$

The visual security level may then be further given as:

$$VSL = \frac{(C + I \cdot \rho/\pi \cdot (C + 1)/(P \cdot L))}{(C-1)} \qquad \text{eqn. 7}$$

where off-axis relative luminance, P is typically defined as the percentage of head-on luminance, L at the snooper angle and the display may have image contrast ratio C and the surface reflectivity is ρ.

The off-axis relative luminance, P is sometimes referred to as the privacy level. However, such privacy level P describes relative luminance of a display at a given polar angle compared to head-on luminance, and is not a measure of privacy appearance.

The display may be illuminated by Lambertian ambient illuminance I. Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. The visual security level may then be approximated to:

$$VSL=1+I \cdot \rho/(\pi \cdot P \cdot L) \qquad \text{eqn. 8}$$

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min}) \qquad \text{eqn. 9}$$

and so:

$$M=((Y+R)-(K+R))/((Y+R)+(K+R))=(Y-K)/(Y+K+2 \cdot R) \qquad \text{eqn. 10}$$

Thus the visual security level is equivalent (but not identical to) 1/M. In the present discussion, for a given off-axis relative luminance, P the wide angle image visibility, W is approximated as $$W=1/VSL=1/(1+I \cdot \rho/(\pi \cdot P \cdot L)) \qquad \text{eqn. 11}$$

It would be desirable to provide a switchable privacy display with reduced image contrast for off-axis viewing.

FIG. 1 is a schematic diagram illustrating in side perspective view a switchable privacy display 100 comprising a transmissive spatial light modulator 48, a switchable retarder 501, and a passive compensation retarder 530 arranged between input polariser 210 that is crossed with output polariser 218.

The spatial light modulator 48 comprises a layer of liquid crystal material 214 arranged to output light rays 400 on an output side.

In the present disclosure, spatial light modulator 48 comprises a pixelated liquid crystal phase modulator comprising transparent substrates 212, 216, liquid crystal layer 214 and red, green and blue pixels 220, 222, 224. Input polariser 210 is arranged on an input side of the spatial light modulator 48. Output polariser 218 is arranged on the output side of the spatial light modulator 48.

Plural retarders 500 are arranged between the input polariser 210 and the output polariser 218 and may be arranged on either the input side or the output side of spatial light modulator 48. In FIG. 1, the plural retarders 500 are illustrated as arranged on the input side of the spatial light modulator 48.

The plural retarders 500 include at least one switchable liquid crystal retarder 501 comprising a layer 514 of liquid crystal material 513 and further comprise at least one passive retarder 530.

The spatial light modulator 48 is transmissive and the display device 100 further comprises a backlight 20 on the input side of the input polariser 210. Backlight 20 is arranged to illuminate the optical stack 48 with light cone 402A, For the present embodiments, the size of the light cone may be the solid angle determined by the full width half maximum luminance in comparison to the peak luminance or head-on luminance.

The backlight 20 comprises input light sources 15, waveguide 1, rear reflector 3 and optical stack 5 comprising diffusers, light turning films and other known optical backlight structures. Illustrative embodiments of backlight 20 that further provide directional illumination are described below with reference to FIGS. 20A-D.

The output light cone 402D describes the light cone formed by output light rays 400 and may have the same size as the light cone 402A, or as will be described below may be modified by means of further luminance control elements.

Figure 2:
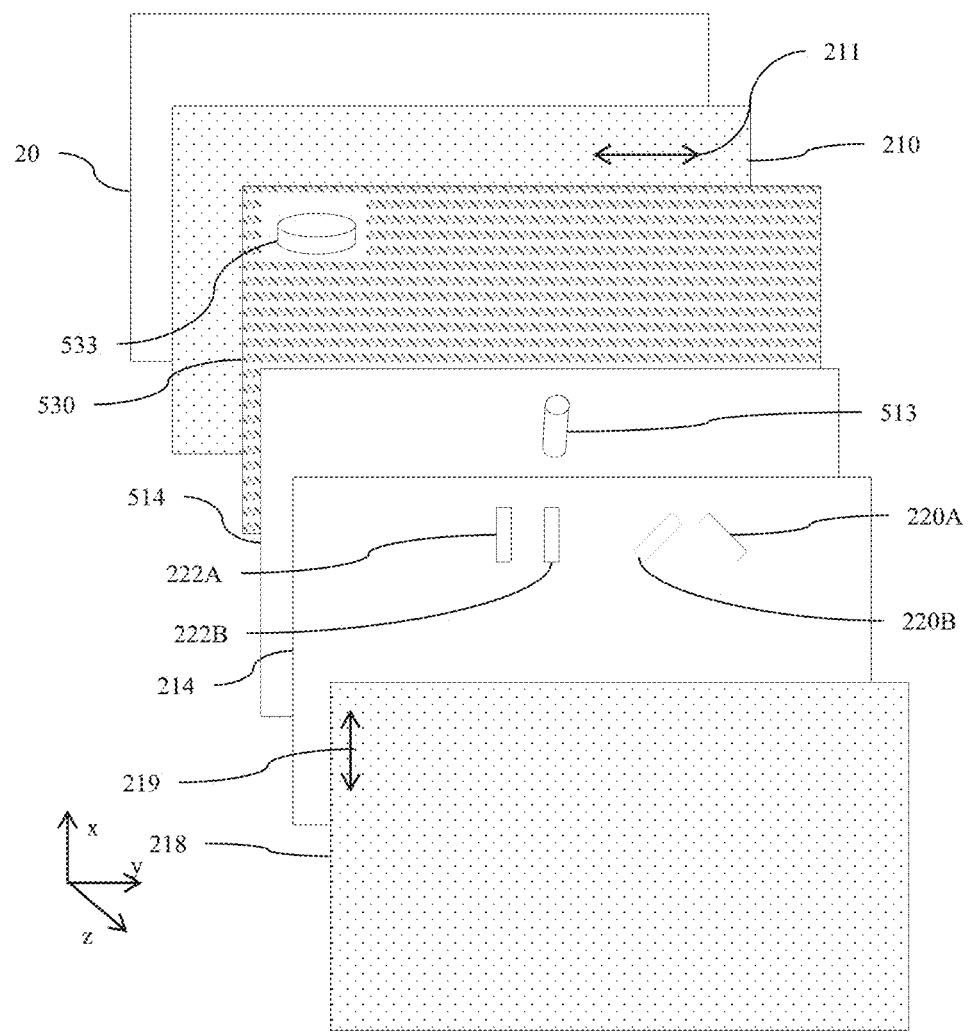
FIG. 2 is a schematic diagram illustrating in front view alignment of optical layers in the optical stack of FIG. 1.

FIG. 2 is a schematic diagram illustrating in front view alignment of optical layers in the optical stack of FIG. 1. The input polariser 210 has an electric vector transmission direction 211 that is orthogonal to the electric vector transmission direction 219 of the output polariser 218. As will be described below, passive compensation retarder 533 comprises a negative dielectric anisotropy material 533 that has an optical axis that is perpendicular to the plane of the passive retarder 530. The liquid crystal layer 214 of the spatial light modulator has liquid crystal material 213 that can be switched in orientation in the plane of the liquid crystal layer by means of an applied electric field as will be described.

Figure 3:
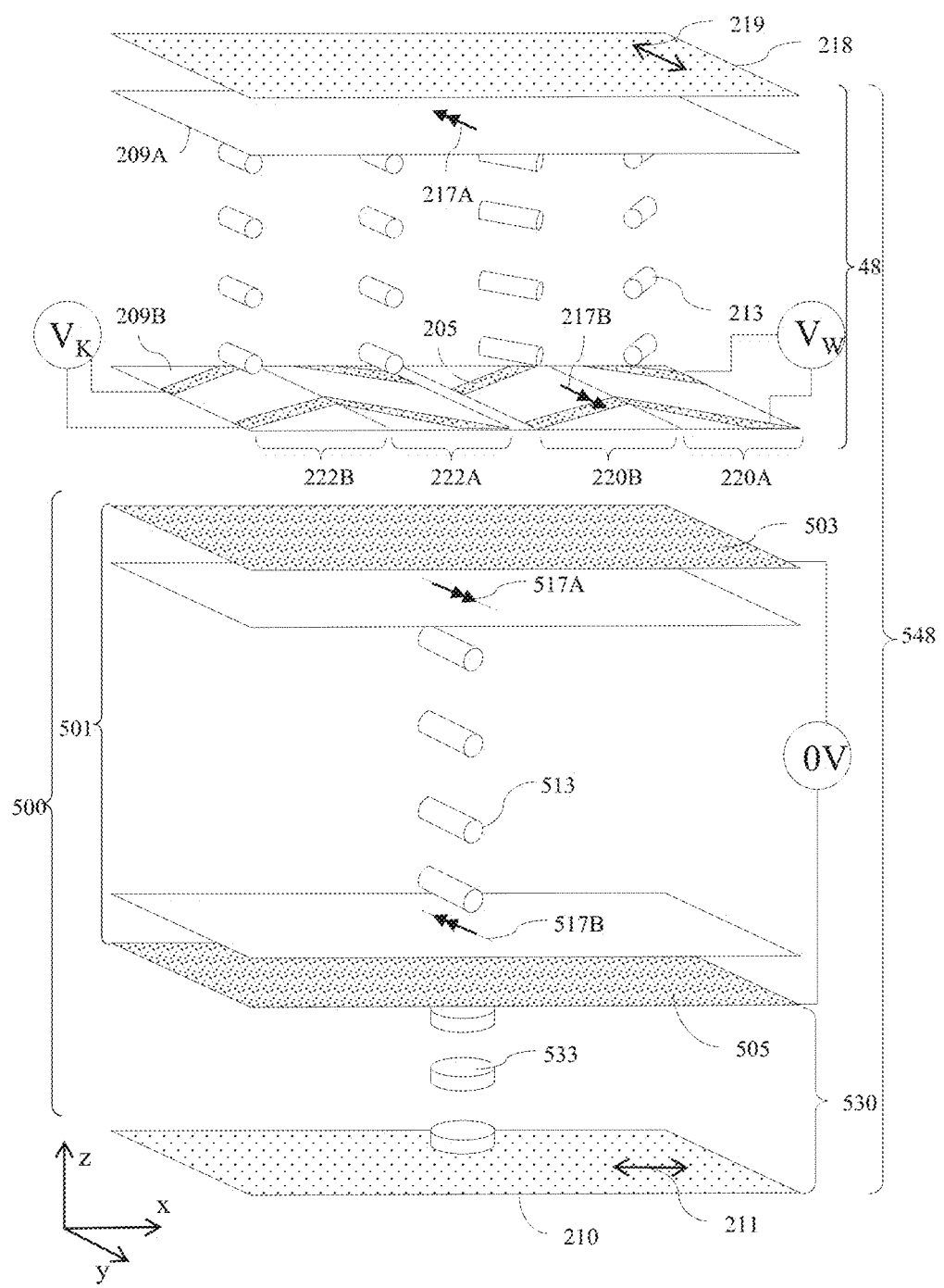
FIG. 3 is a schematic diagram illustrating in perspective side view an arrangement of an in-plane switching spatial light modulator and plural retarder layers arranged between crossed polarisers wherein the plural retarders comprise a passive negative C-plate compensation retarder and a homogeneously aligned switchable liquid crystal retarder, in a wide angle mode of operation.

FIG. 3 is a schematic diagram illustrating in perspective side view an arrangement of an in-plane switching spatial light modulator 48 and plural retarder layers 500 arranged between crossed polarisers 210, 218 wherein the plural retarders 500 comprise a passive negative C-plate compensation retarder 530 and a homogeneously aligned switchable liquid crystal retarder 501, in a wide angle mode of operation.

In the embodiment of FIG. 3, the spatial light modulator 48 is one of an in-plane switching device or a fringe field switching device. Electrodes 503, 505 are arranged to apply a voltage for switching the layer 514 of liquid crystal material 415.

Homogeneous alignment layers 217A, 217B are arranged on opposing sides of the liquid crystal layer 214 that have pretilt directions that are parallel or anti-parallel to the transmission direction 219 of the output polariser. In other arrangements (not shown) the alignment layers may have pretilt directions that are orthogonal to the polariser 218 electric vector transmission direction 219.

When no voltage is applied across the electrodes in pixels 222A, 222B (so that voltage $V_K$ is zero) the liquid crystal material 213 provides no phase modulation of polarisation states parallel to the output polariser 218 electric vector transmission direction 219. As will be described for on-axis light in privacy mode and for on-axis and off-axis light in wide angle mode, the pixels 222A, 222B provide low transmission after the output polarisation state from the layer 214 is analysed at output polariser 218.

Pixel regions 220A, 220B illustrate first and second regions of a pixel operating in high transmission state and driven by voltage $V_W$ across electrodes 205 that are inclined at +/−45 degrees to the transmission direction 219 of the output polariser 218. For maximum transmission, the liquid crystal molecules of material 213 are rotated by the in-plane electric field so that there is a nominal orientation of the molecules of +45 degrees for the first region and −45 degrees for the second region. Incident polarisation states are arranged to undergo a half wave phase retardation. In cases in which the polarisation component incident onto the layer 214 is linear polarised at 0 degrees, then the polarisation component output from the layer 214 is rotated by 90 degrees so that it is parallel to the direction 219 and transmitted. The regions 220A, 220B are arranged to provide an averaging of polar angular transmission differences between clockwise and anti-clockwise polarisation rotations.

An illustrative embodiment of the plural retarders 500 is given in TABLE 1. In wide angle mode, zero voltage is applied across the switchable liquid crystal layer 514.

TABLE 1

| | | Passive retarder(s) | | Active LC retarder | | | | | |
|---|---|---|---|---|---|---|---|---|---|
| FIG. | Mode | Type | Δn.d/ nm | Alignment layers | Pretilt/ deg | Δn.d/ nm | Δε | Voltage/ V | LCD mode |
| 3, 5 6, 8A | Wide Privacy | Negative C | −300 ± 100 | Homogeneous Homogeneous | −2 2 | 400 ± 100 | 10.0 | >5 2.5 ± 0.2 | In-plane |

The switchable liquid crystal retarder 501 comprises two surface alignment layers 517a, 517b disposed adjacent to the layer of liquid crystal material 513 and on opposite sides thereof and each arranged to provide homogenous alignment in the adjacent liquid crystal material 513; and the liquid crystal material 513 has a positive dielectric anisotropy.

The at least one passive retarder comprises a passive retarder 530 having an optical axis perpendicular to the plane of the passive retarder 530 and having and having a retardance for light of a wavelength of 550 nm in a range from −400 nm to −200 nm.

The propagation of light through the optical stack 548 when the liquid crystal material 533 of the switchable liquid crystal retarder 530 is arranged for wide angle mode as illustrated in FIG. 3 will now be described.

Figure 4A:
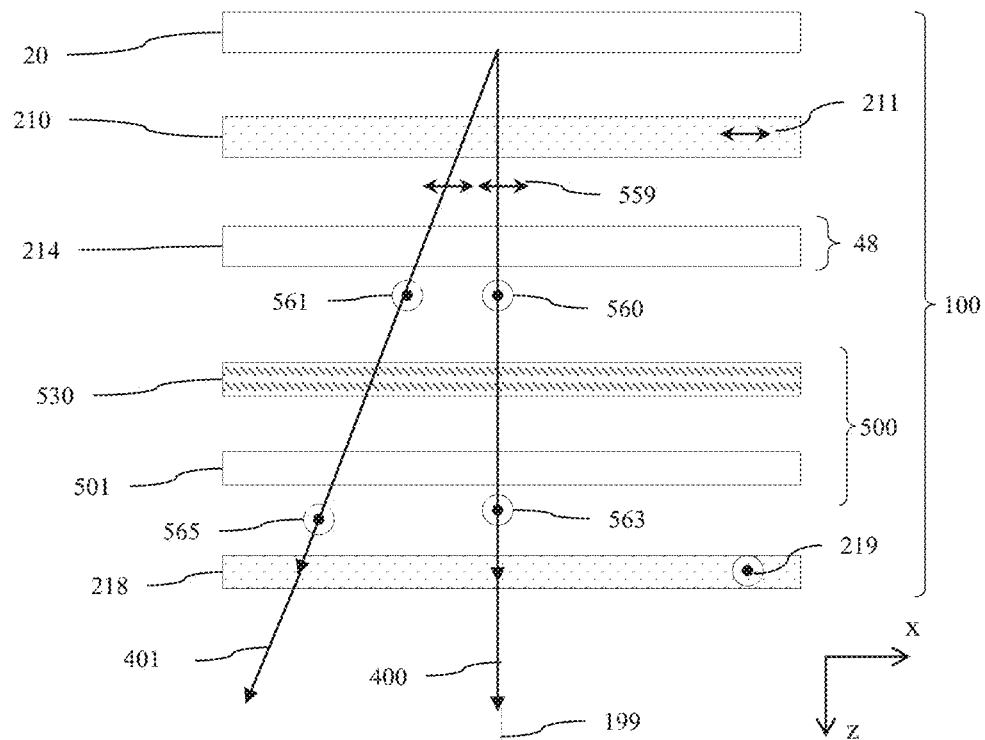
FIG. 4A is a schematic diagram illustrating in side view propagation of output light from a spatial light modulator through the optical stack of FIG. 3 in a wide angle mode of operation for a maximum transmission state.

FIG. 4A is a schematic diagram illustrating in side view propagation of output light from a spatial light modulator 48 through the optical stack of FIG. 3 in a wide angle mode of operation for a maximum transmission state. The propagation of on-axis light ray 400 and off-axis light ray 401 will now be considered.

In comparison to the arrangement of FIG. 3, in the embodiment of FIG. 4A the plural retarders 500 are arranged between the spatial light modulator 48 and the output polariser 218, however the output polarisation state achieved in both embodiments is similar or identical.

Polarisation component 559 from input polariser 210 is incident onto spatial light modulator 48. As illustrated in FIG. 3, pixels 220A, 220B provide a linear polarisation component 560 for on-axis light and similarly a linear polarisation component 561 for off-axis light that is substantially the same as the component 560.

In the wide angle mode of operation, the plural retarders 500 are arranged to provide substantially no modification of the polarisation components 560, 561 so that rays 400, 401 have polarisation components 563, 565 that are substantially linear with directions parallel to the transmission direction 219 of the output polariser 218. Thus light rays 400, 401 are transmitted with high luminance. Advantageously a pixel that has high transmittance over a wide polar viewing angle range is provided.

The propagation of light rays for black pixels in wide angle mode will now be described.

Figure 4B:
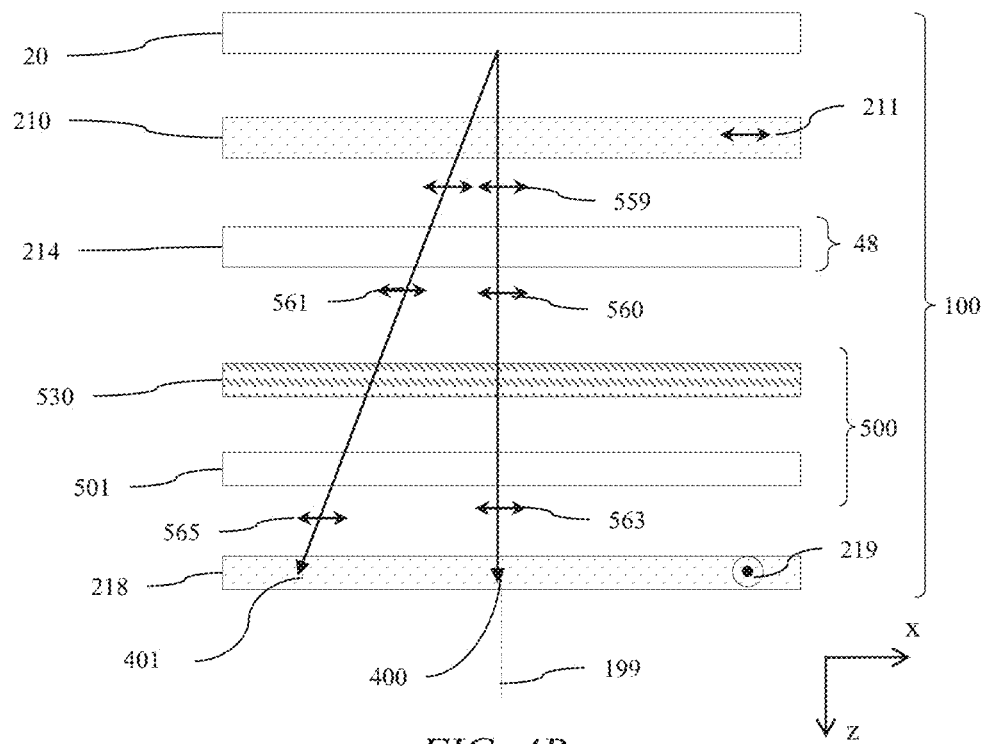
FIG. 4B is a schematic diagram illustrating in side view propagation of output light from a spatial light modulator through the optical stack of FIG. 3 in a wide angle mode of operation for a minimum transmission state.

FIG. 4B is a schematic diagram illustrating in side view propagation of output light from a spatial light modulator 48 through the optical stack of FIG. 3 in a wide angle mode of operation for a minimum transmission state. In comparison to FIG. 4A, the output polarisation components 560, 561 from the spatial light modulator 48 are unmodified in comparison to input component 559. The plural retarders 500 provide minimal further polarisation modification and the output components 563, 565 are substantially absorbed at the output polariser 218.

Advantageously a pixel that is black with low transmittance over a wide polar viewing angle range is provided.

Figure 5:
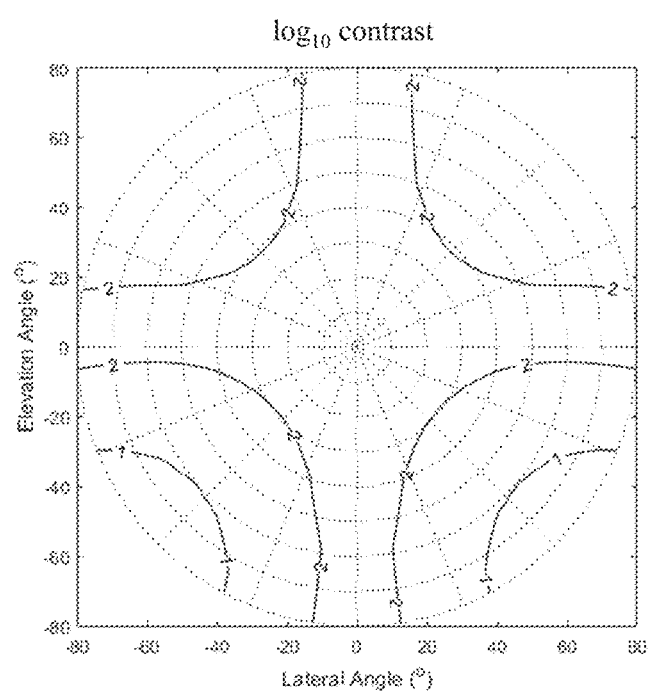
FIG. 5 is a schematic graph illustrating the variation of the logarithm of contrast with polar direction for the transmitted light rays in FIGS. 4A-B.

FIG. 5 is a schematic graph illustrating the variation of the logarithm of contrast with polar direction for the transmitted light rays in FIGS. 4A-B and the illustrative embodiment of TABLE 1. In combination the rays 400, 401 achieve high contrast over a wide polar range. Advantageously the display 100 may be visible by multiple users over a wide viewing range of angles.

The operation of the display of TABLE 1 in privacy mode will now be described. In comparison to the arrangement of FIG. 3, a voltage $V_R$ is applied to the layer 514 so that the material 513 is re-oriented. Such reorientation provides a splayed retarder structure, with retardance properties that are spatially uniform across the area of the display 100.

Figure 6:
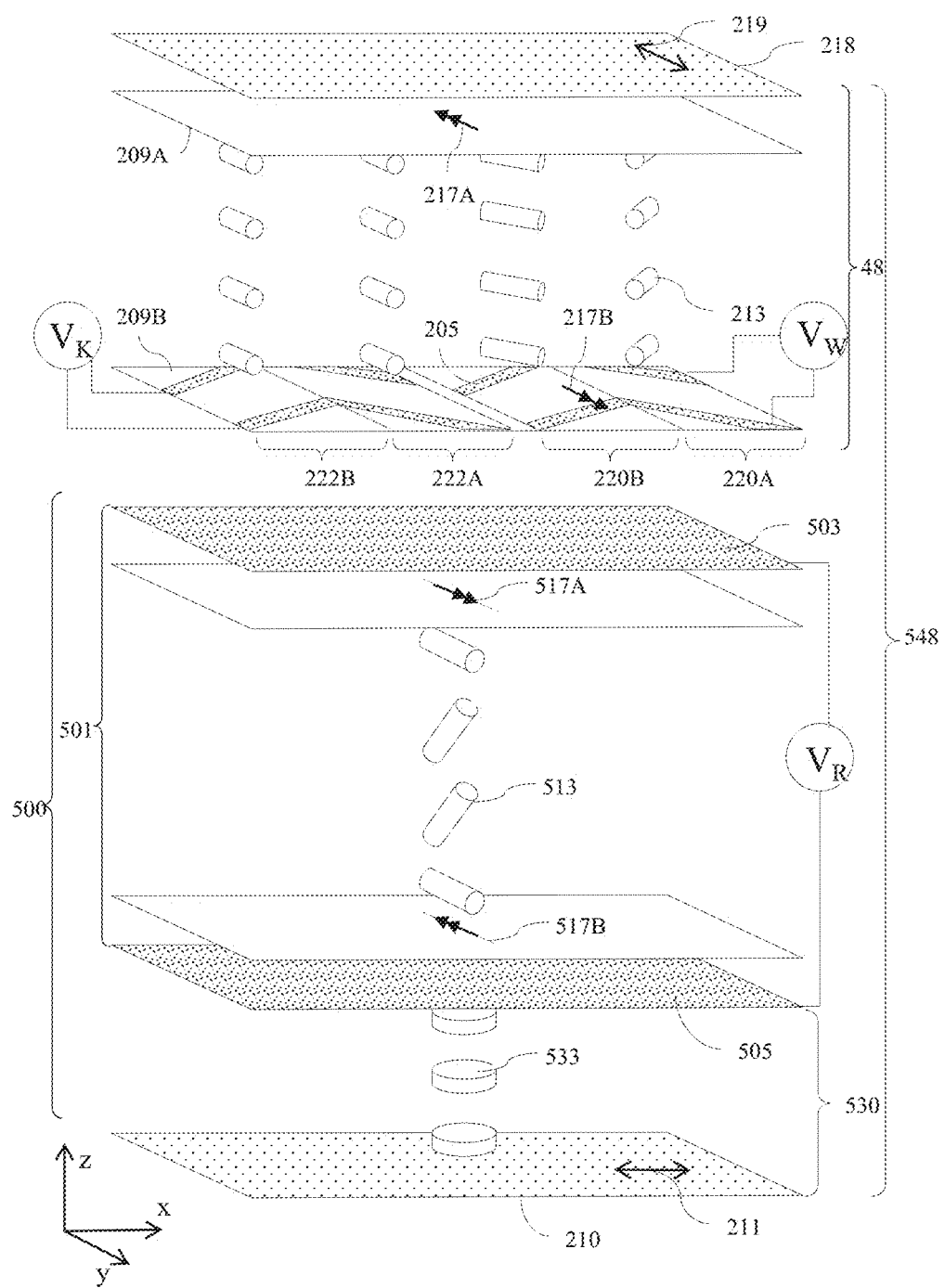
FIG. 6 is a schematic diagram illustrating in perspective side view an arrangement of an in-plane switching spatial light modulator and plural retarder layers arranged between crossed polarisers wherein the plural retarders comprise a passive negative C-plate compensation retarder and a homogeneously aligned switchable liquid crystal retarder, in a privacy mode of operation.

FIG. 6 is a schematic diagram illustrating in perspective side view an arrangement of an in-plane switching spatial light modulator 48 and plural retarders 500 arranged between crossed polarisers 210, 218 wherein the plural retarders 500 comprise a passive negative C-plate compensation retarder 530 and a homogeneously aligned switchable liquid crystal retarder 501, in a privacy mode of operation.

The propagation of light through the optical stack 548 when the liquid crystal material 533 of the switchable liquid crystal retarder 530 is arranged for privacy mode as illustrated in FIG. 6 will now be described.

Figure 7A:
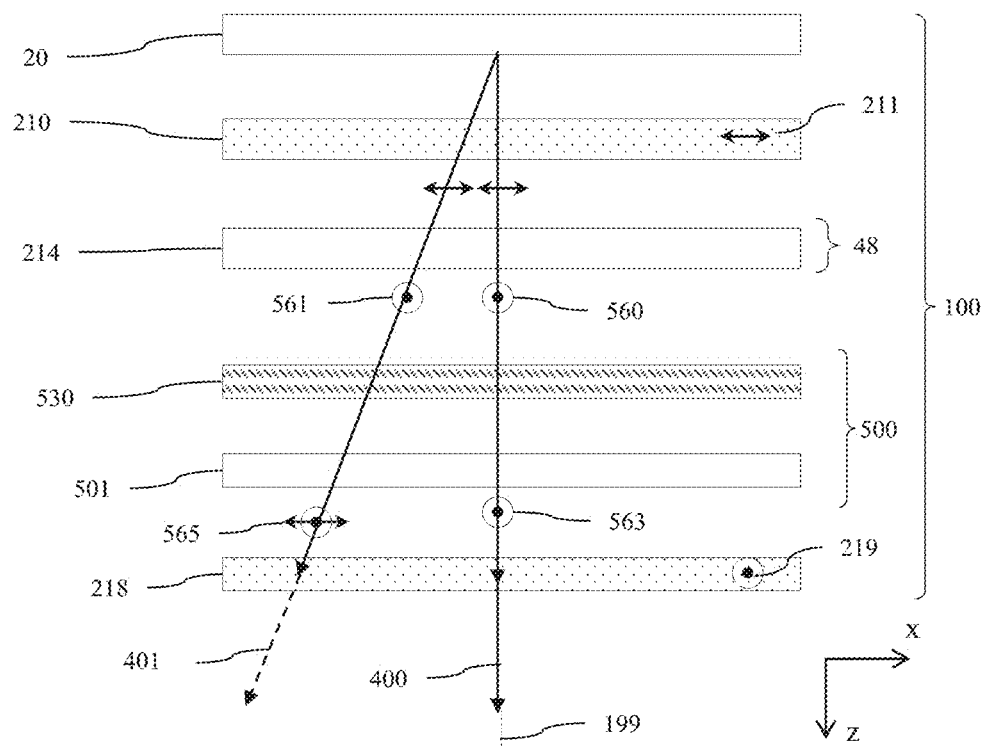
FIG. 7A is a schematic diagram illustrating in side view propagation of output light from a spatial light modulator through the optical stack of FIG. 6 in a privacy mode of operation for a maximum transmission state.

FIG. 7A is a schematic diagram illustrating in side view propagation of output light from a spatial light modulator 48 through the optical stack of FIG. 6 in a privacy mode of operation for a maximum transmission state.

In comparison to the arrangement of FIG. 4A, the plural retarders 500 are arranged to introduce no phase shift to polarisation components 560 of light passed by the input polariser 210 along an axis 199 along a normal to the plane of the retarder 500 and are arranged to introduce a phase shift to polarisation components 561 of light passed by the input polariser 210 along an axis inclined to the axis 199 along a normal to the plane of the retarder in a switchable mode of the at least one switchable liquid crystal retarder 501.

Thus on-axis ray has polarisation component 560 is transmitted with unmodified polarisation component 563 from the plural retarders 500 and is transmitted by the output polariser 218. However, off-axis ray 401 has polarisation component that comprises a combination of polarisation components that are respectively parallel and perpendicular to the electric vector transmission direction 219 of the output polariser 218, providing an intermediate output transmission, rather than a maximum transmission.

Figure 7B:
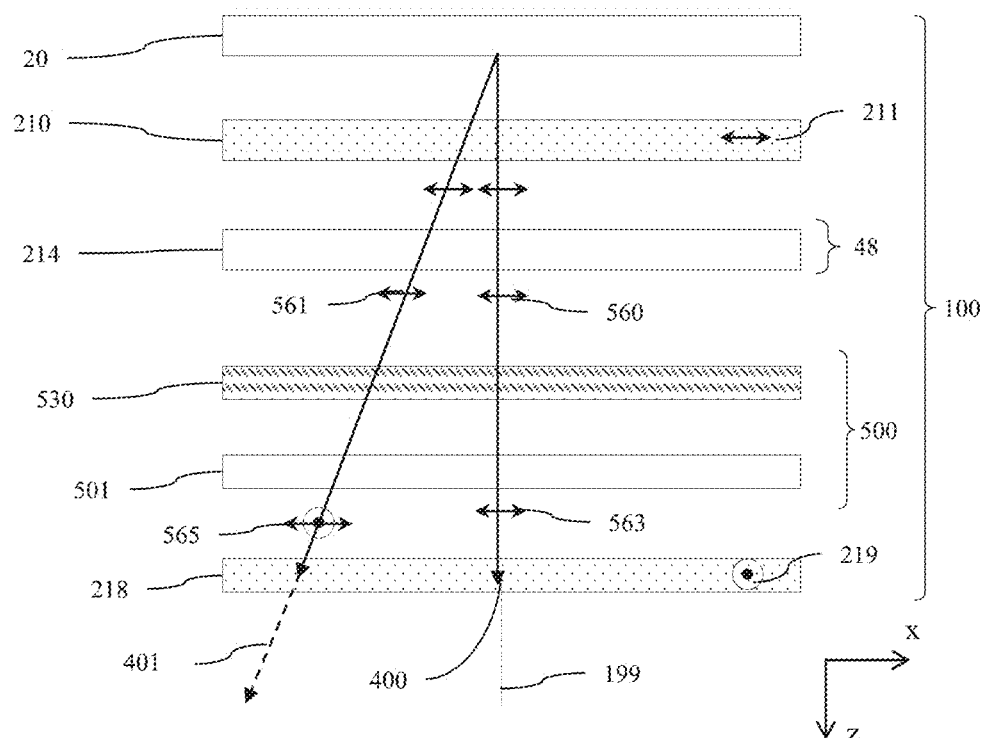
FIG. 7B is a schematic diagram illustrating in side view propagation of output light from a spatial light modulator through the optical stack of FIG. 6 in a privacy mode of operation for a minimum transmission state.

FIG. 7B is a schematic diagram illustrating inside view propagation of output light from a spatial light modulator 48 through the optical stack of FIG. 6 in a privacy mode of operation for a minimum transmission state. As with FIG. 7A, the polarisation component 563 of the on-axis ray 400 is substantially unmodified, while the off-axis ray 401 has a polarisation component 565 that is modified, to provide an intermediate output transmission.

The polar contrast profiles for FIGS. 7A-B for the present illustrative embodiment will now be described.

Figure 8A:
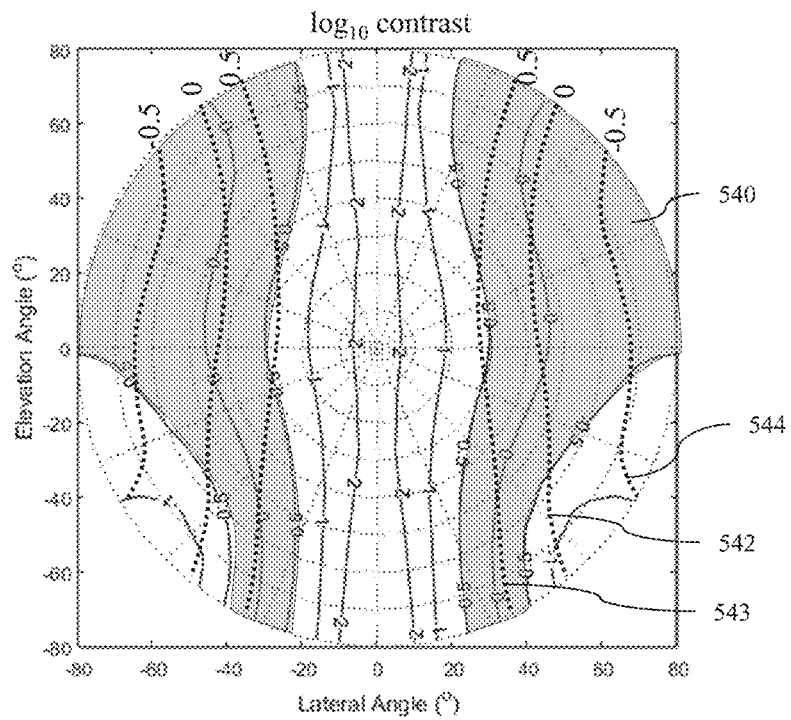
FIG. 8A is a schematic graph illustrating the variation of the logarithm of contrast with polar direction for the transmitted light rays in FIGS. 7A-B for the arrangement of FIG. 6.

FIG. 8A is a schematic graph illustrating the variation of the logarithm of contrast with polar direction for the transmitted light rays in FIGS. 7A-B for the arrangement of FIG. 6 and TABLE 1. Advantageously high head-on contrast ratio is achieved while the off-axis contrast ratio is reduced, increasing visual security level, VSL for off-axis snoopers.

The polar region 540 that provides high visual security level will now be considered.

For iso-contrast lines where $\log_{10}$ contrast is 0, image contrast is 1:1 and the display is substantially invisible to off-axis snoopers. However the polar region in which such low visibility is present is limited. For the present discussion, the polar region 540 over which $0.5 > \log_{10}$ contrast $> -0.5$ (3.16:1>contrast>0.316:1) will be considered. For contrast levels less than 1:1, the images are inverted, however the image structure such as text and outlines will remain visible to an off-axis snooper.

By way of comparison with the embodiments of the present disclosure, the polar region 540 for displays not comprising the passive compensation retarder 530 will now be considered.

Figure 8B:
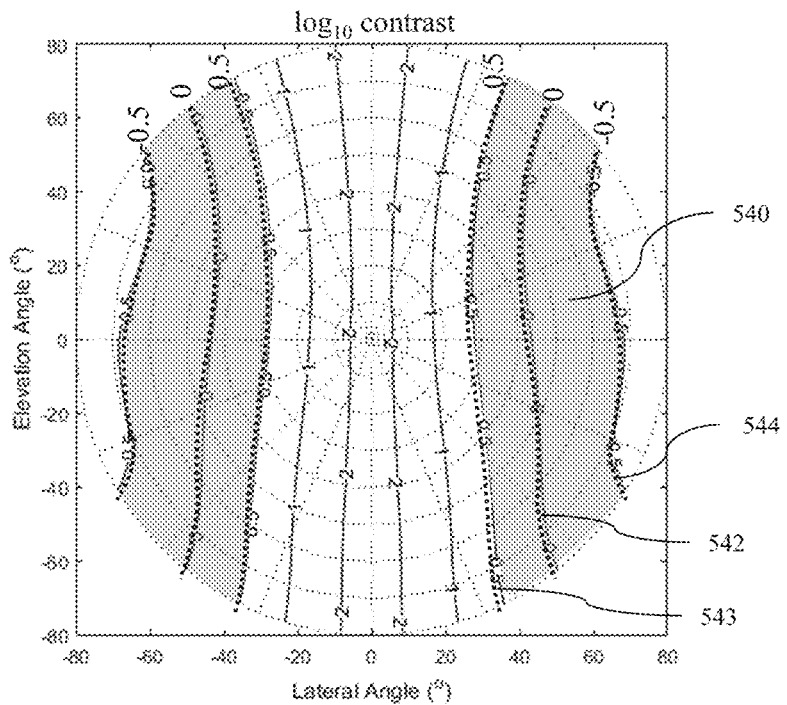
FIG. 8B is a schematic graph illustrating the variation of the logarithm of contrast with polar direction for the transmitted light rays in FIGS. 7A-B for the arrangement of FIG. 6 omitting the compensation retarder.

FIG. 8B is a schematic graph illustrating the variation of the logarithm of contrast with polar direction for the transmitted light rays in FIGS. 7A-B for a possible display structure in which the arrangement of FIG. 6 omits the compensation retarder. Iso-contrast contours 542, 543, 544 are provided for comparison purposes with the present embodiments.

Returning to FIG. 8A, the region 540 has an area for positive elevation angles that is substantially increased, achieving a wider range of contrast reduction. Typically snooper locations also have a positive elevation for displays, with snoopers more likely looking down onto the display for off-axis polar locations.

Advantageously the size of polar region 540 over which the display has reduced image visibility, is increased. In displays such as laptop displays where azimuthal viewing angles above the horizontal that are typically visible to snoopers visual security level, VSL may be increased.

In polar regions for the display user that are close to on-axis, the polar region 540 of low image visibility is similar to the possible display of FIG. 8B and thus advantageously image degradations for the primary user are not further compromised.

Further embodiments of liquid crystal retarder 501 and compensation retarder 530 will now be described.

Figure 9:
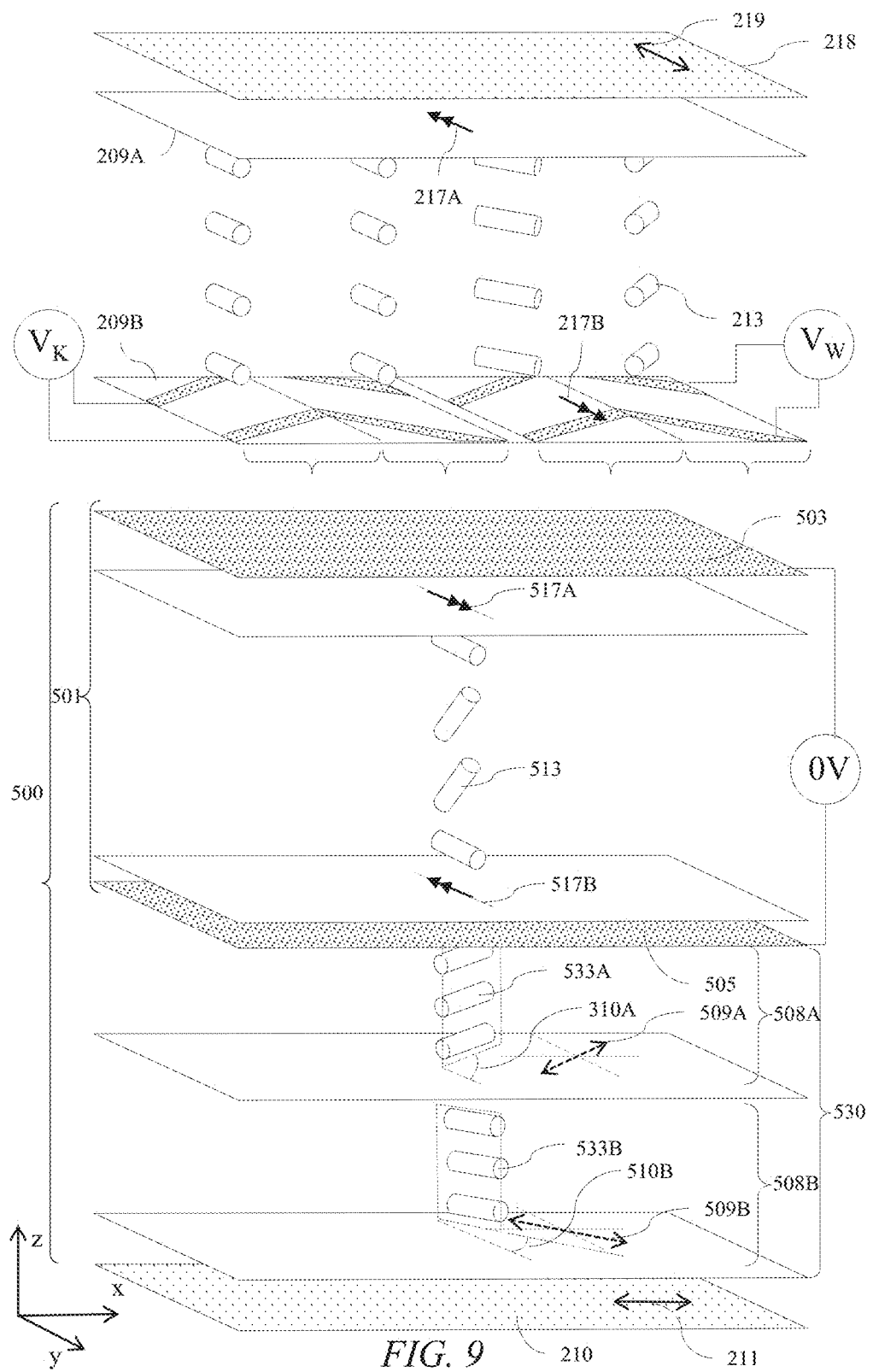
FIG. 9 is a schematic diagram illustrating in front view alignment of optical layers in an optical stack comprising crossed A-plate passive compensation retarders, homogeneously aligned liquid crystal switchable retarder and in-plane switching liquid crystal spatial light modulator.
Figure 10A:
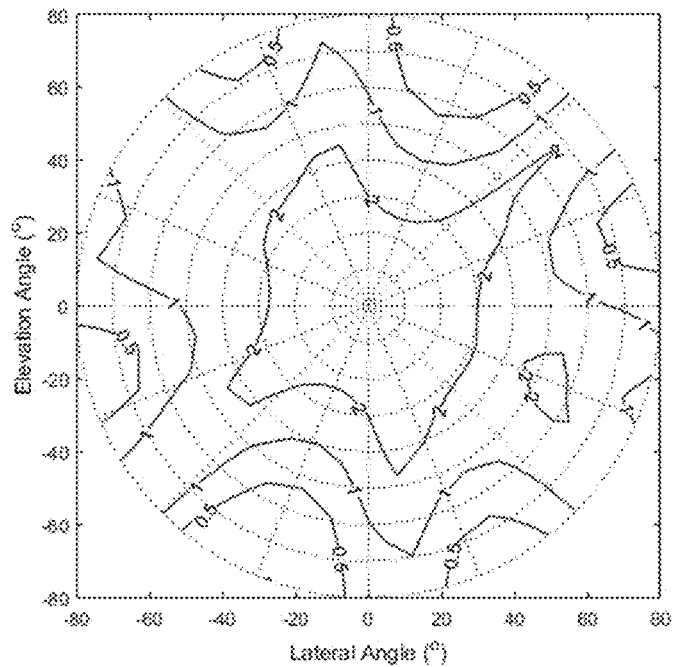
FIG. 10A is a schematic graph illustrating the variation of the logarithm of contrast with polar direction for the transmitted light rays through the optical stack of FIG. 9 in wide angle mode.
Figure 10B:
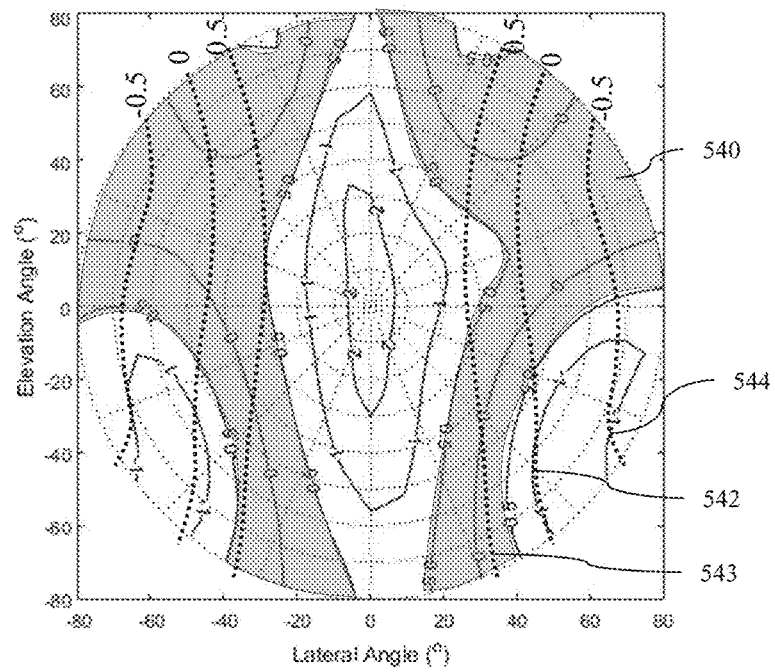
FIG. 10B is a schematic graph illustrating the variation of the logarithm of contrast with polar direction for the transmitted light rays through the optical stack of FIG. 9 in privacy mode.

FIG. 9 is a schematic diagram illustrating in front view alignment of optical layers in an optical stack comprising crossed A-plate passive compensation retarders, homogeneously aligned liquid crystal switchable retarder and in-plane switching liquid crystal spatial light modulator 48, with an illustrative embodiment described in TABLE 2; FIG. 10A is a schematic graph illustrating the variation of the logarithm of contrast with polar direction for the transmitted light rays through the optical stack of FIG. 9 in wide angle mode; and FIG. 10B is a schematic graph illustrating the variation of the logarithm of contrast with polar direction for the transmitted light rays through the optical stack of FIG. 9 in privacy mode.

TABLE 2

| FIG. | Mode | Passive retarder(s) | | Active LC retarder | | | | | LCD mode |
|---|---|---|---|---|---|---|---|---|---|
| | | Type | Δn.d/ nm | Alignment layers | Pretilt/ deg | Δn.d/ nm | Δε | Voltage/ V | |
| 10A | Wide | Crossed A | 350 @ 45 ± 2° 350 @ 135 ± 2° | Homogeneous | −2 | 400 | 10.0 | >5 | In-plane |
| 10B | Privacy | | | Homogeneous | 2 | | | 2.5 ± 0.2 | |

The switchable liquid crystal retarder 501 comprises two surface alignment layers 517a, 517b disposed adjacent to the layer 514 of liquid crystal material 513 and on opposite sides thereof and each arranged to provide homogenous alignment in the adjacent liquid crystal material 513; and the liquid crystal material 513 has a positive dielectric anisotropy.

The at least one passive retarder 530 comprises a pair of passive retarders 508A, 508B having optical axes parallel to the plane of the passive retarder that are crossed and having a retardance for light of a wavelength of 550 nm in a range from 250 nm to 500 nm. The at least one passive retarder 530 comprises a pair of passive retarders 508A, 508B having optical axes parallel to the plane of the passive retarder 530 that are crossed. The pair of passive retarders 508A, 508B have optical axes that extend at 45° and at 135°, respectively, with respect to an electric vector transmission direction of the input polariser 210 or the output polariser 218.

As illustrated in FIG. 10B the polar region for contrast reduction is increased for look-down directions. Advantageously, in comparison to FIG. 8A the display may further provide increased visual security levels for over-the-the shoulder viewer polar locations that are at elevations above the user but with relatively small lateral viewing angles.

Figure 11:
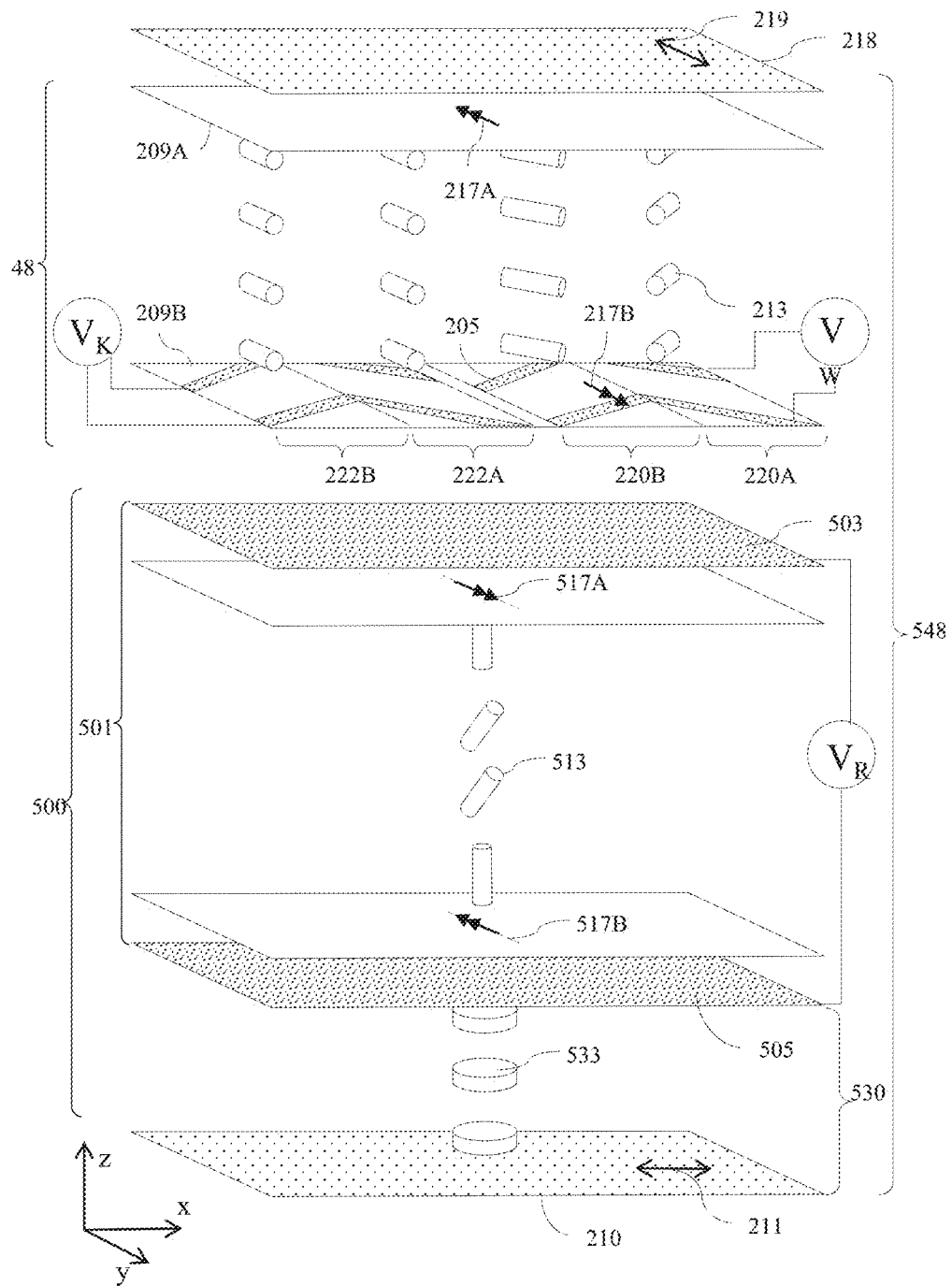
FIG. 11 is a schematic diagram illustrating in front view alignment of optical layers in an optical stack comprising a negative C-plate passive compensation retarder, homeotropically aligned liquid crystal switchable retarder and in-plane switching liquid crystal spatial light modulator.
Figure 12A:
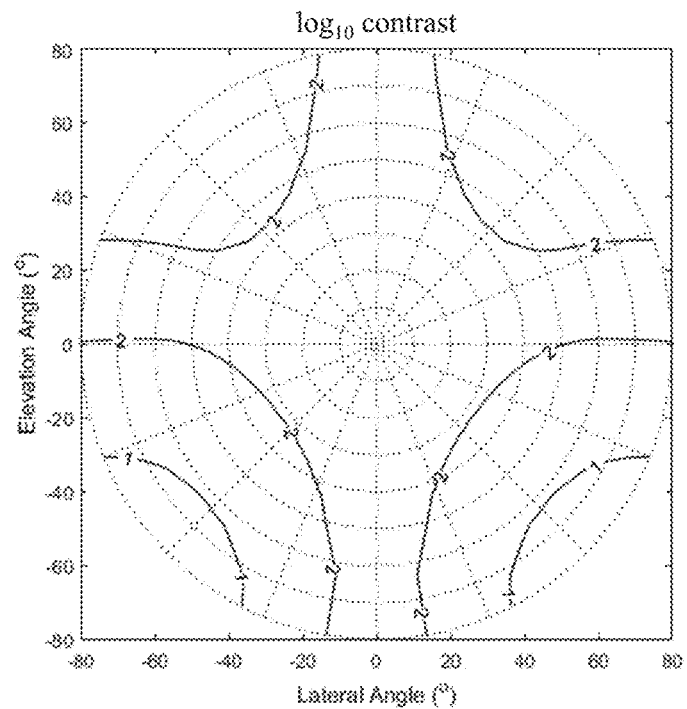
FIG. 12A is a schematic graph illustrating the variation of the logarithm of contrast with polar direction for the transmitted light rays through the optical stack of FIG. 11 in wide angle mode.
Figure 12B:
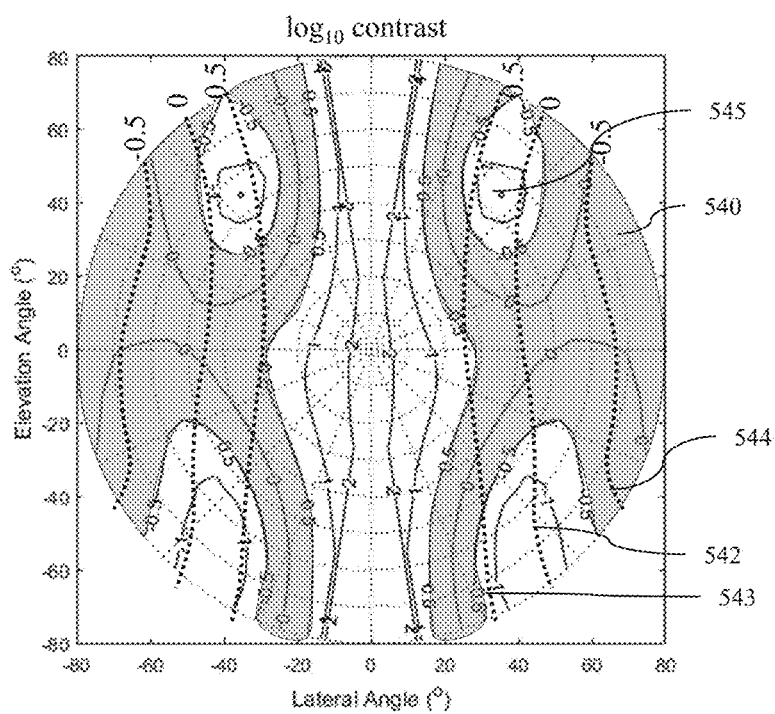
FIG. 12B is a schematic graph illustrating the variation of the logarithm of contrast with polar direction for the transmitted light rays through the optical stack of FIG. 11 in privacy mode.

FIG. 11 is a schematic diagram illustrating in front view alignment of optical layers in an optical stack comprising a negative C-plate passive compensation retarder 530, homeotropically aligned liquid crystal switchable retarder 501 and in-plane switching liquid crystal spatial light modulator 48, with an illustrative embodiment described in TABLE 3;

FIG. 12A is a schematic graph illustrating the variation of the logarithm of contrast with polar direction for the transmitted light rays through the optical stack of FIG. 11 in wide angle mode, and FIG. 12B is a schematic graph illustrating the variation of the logarithm of contrast with polar direction for the transmitted light rays through the optical stack of FIG. 11 in privacy mode.

TABLE 3

| FIG. | Mode | Passive retarder(s) | | Active LC retarder | | | | | LCD mode |
|---|---|---|---|---|---|---|---|---|---|
| | | Type | Δn.d/ nm | Alignment layers | Pretilt/ deg | Δn.d/ nm | Δε | Voltage/ V | |
| 12A | Wide | Negative C | −400 +100/−150 | Homeotropic | −88 | 400 +100/−150 | −4.0 | 0 | In-plane |
| 12B | Privacy | | | Homeotropic | 88 | | | 2.6 ± 0.2 | |

The switchable liquid crystal retarder 501 comprises two surface alignment layers 517a, 517b disposed adjacent to the layer 514 of liquid crystal material 513 and on opposite sides thereof and each arranged to provide homeotropic alignment in the adjacent liquid crystal material 513 and the liquid crystal material 513 has a negative dielectric anisotropy.

The at least one passive retarder 530 comprises a passive retarder having an optical axis perpendicular to the plane of the passive retarder and having and having a retardance for light of a wavelength of 550 nm in a range from −250 nm to −500 nm.

Advantageously such an arrangement may achieve increased visual security levels for snoopers at low elevation directions at high lateral angles.

Further, such an arrangement may achieve increased performance in displays with luminance and reflectivity control as will be described hereinbelow that is optimised for luminance reduction at viewing locations around polar locations such as 545. Such arrangements may have luminance and reflectivity profiles that provide reduced visual security levels at high lateral angles.

Embodiments comprising twisted nematic liquid crystal spatial light modulators 48 will now be described.

Figure 13A:
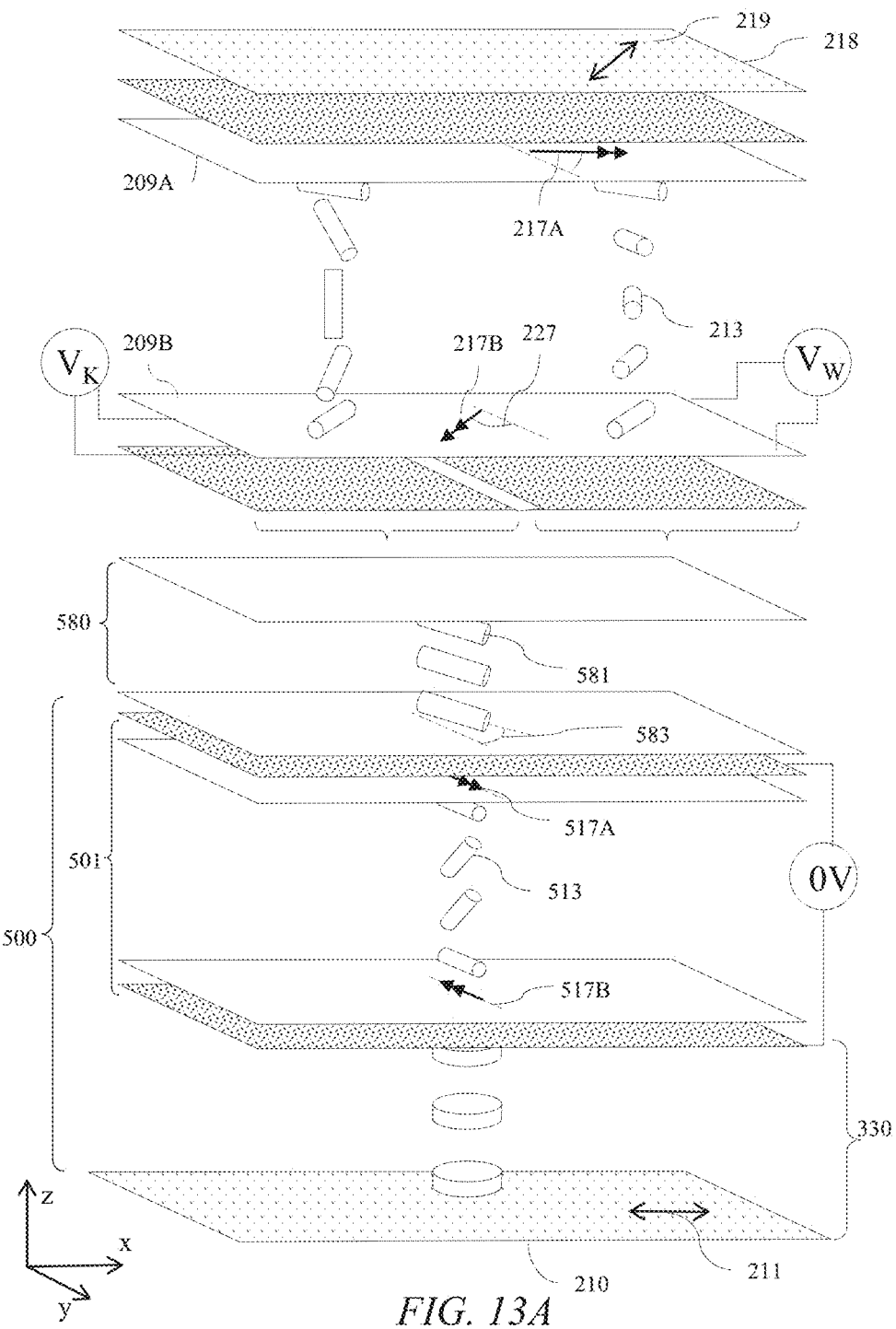
FIG. 13A is a schematic diagram illustrating in front view alignment of optical layers in an optical stack comprising a negative C-plate passive compensation retarder, homogeneously aligned liquid crystal switchable retarder, half waveplate and twisted nematic liquid crystal spatial light modulator.
Figure 13B:
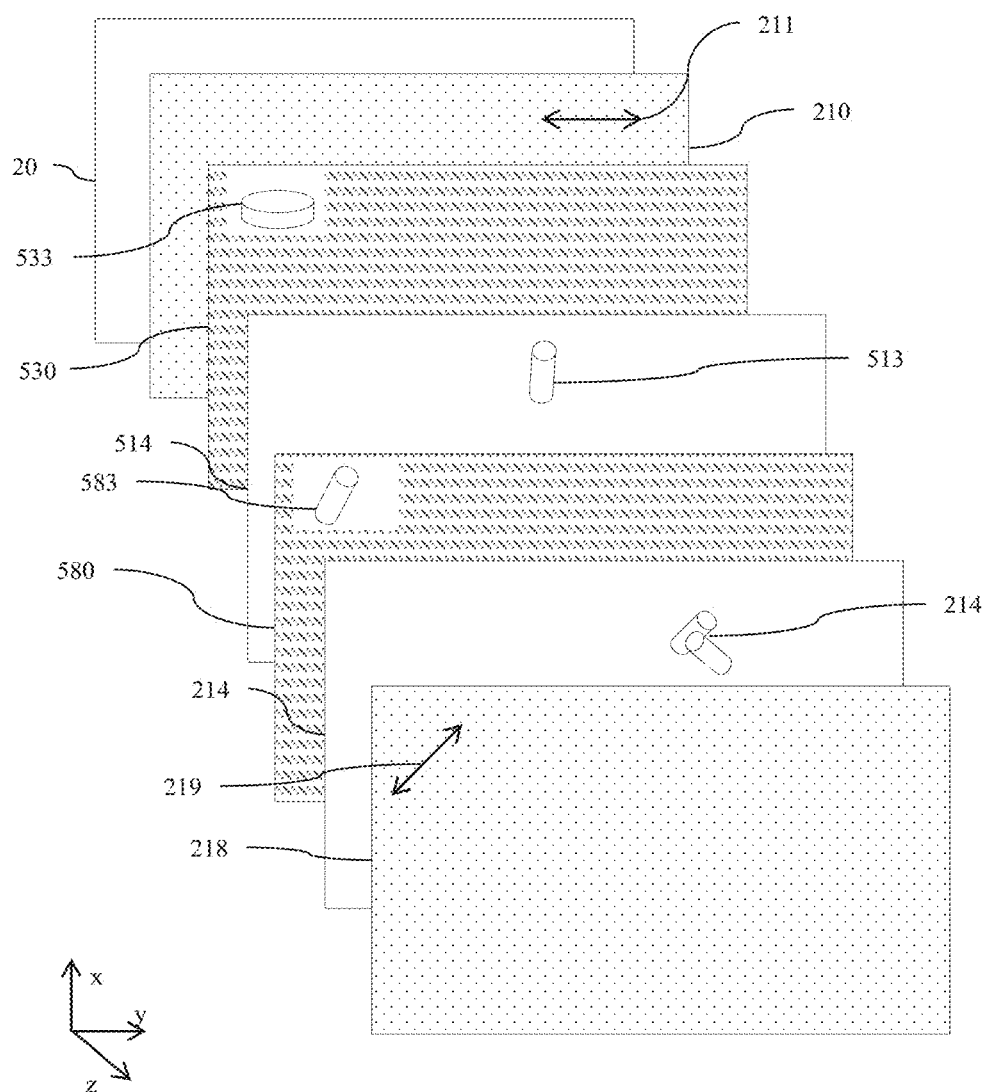
FIG. 13B is a schematic diagram illustrating in front view alignment of optical layers in the optical stack of FIG. 13A.
Figure 14:
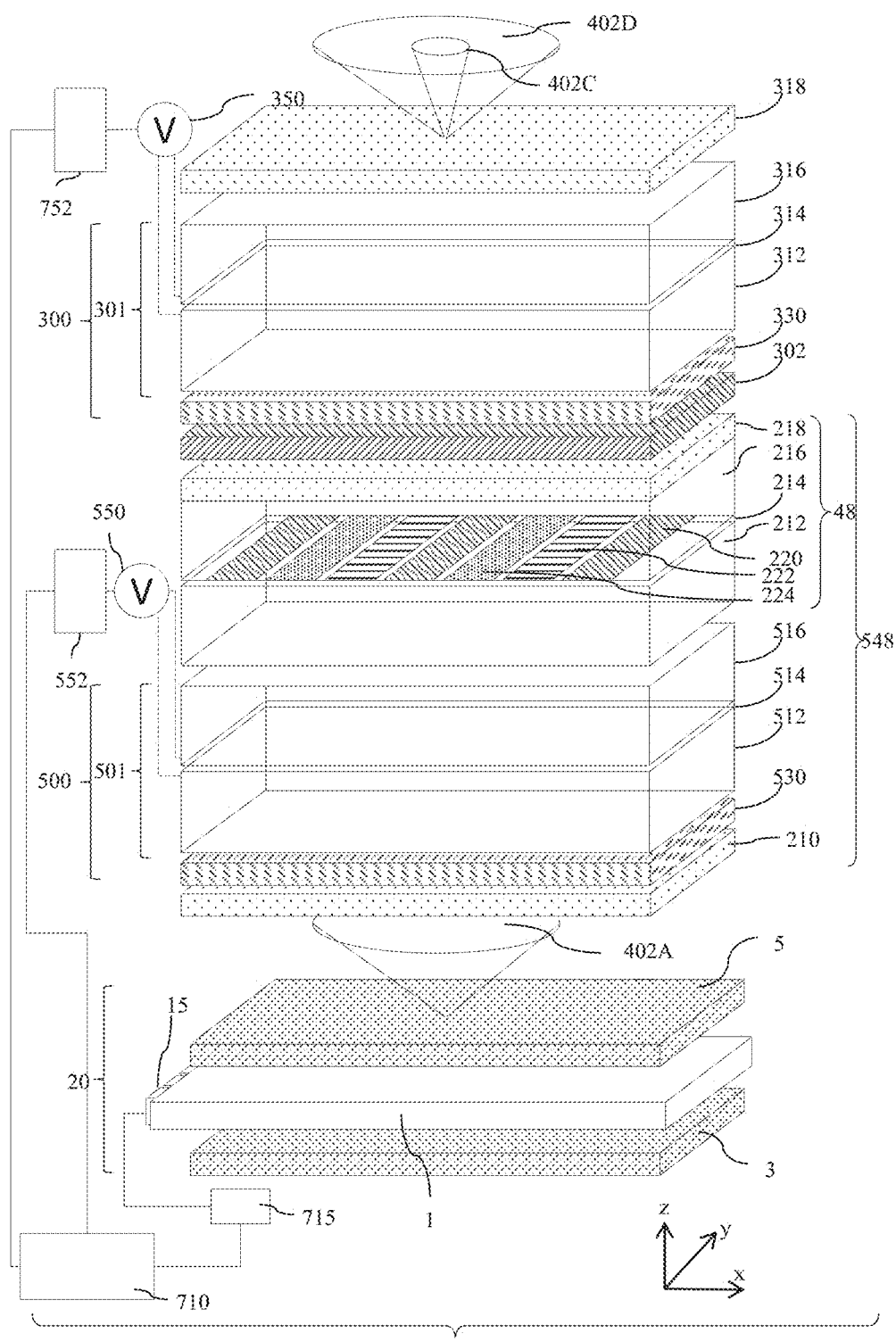
FIG. 14 is a schematic diagram illustrating in side perspective view a switchable privacy display comprising a transmissive spatial light modulator, a switchable retarder and a passive compensation retarder arranged between crossed input and output polarisers; and a reflective polariser, compensated switchable retarder and additional polariser arranged on the output side of the output polariser.
Figure 15:
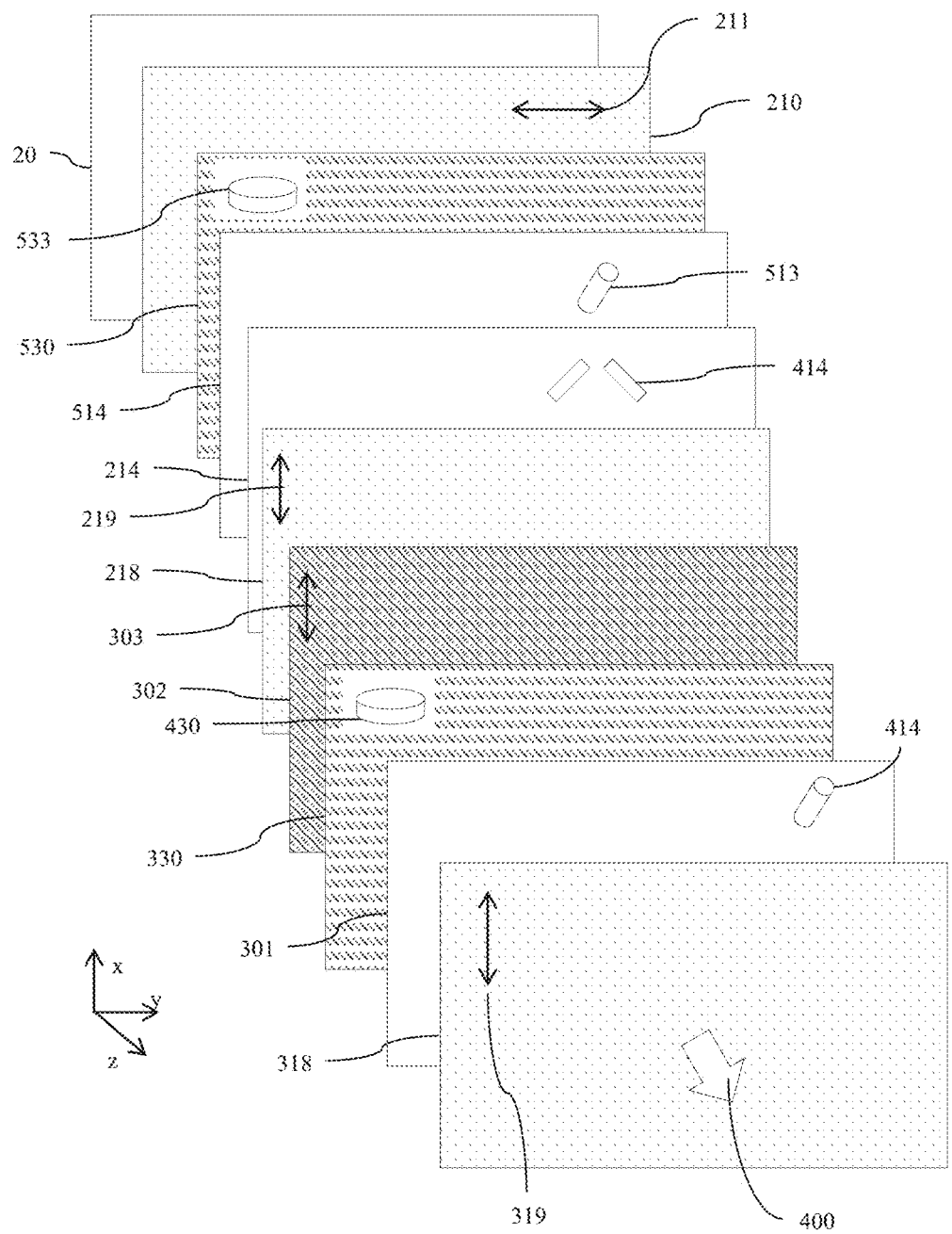
FIG. 15 is a schematic diagram illustrating in front view alignment of optical layers in the optical stack of FIG. 14.

FIG. 13A is a schematic diagram illustrating in front view alignment of optical layers in an optical stack comprising a negative C-plate passive compensation retarder, homogeneously aligned liquid crystal switchable retarder, half waveplate and twisted nematic liquid crystal spatial light modulator 48, with an illustrative embodiment described in TABLE 4; and FIG. 13B is a schematic diagram illustrating in front view alignment of optical layers in the optical stack of FIG. 13A.

switchable retarder 300 and additional polariser 318 arranged on the output side of the output polariser 218; and FIG. 15 is a schematic diagram illustrating in front view alignment of optical layers in the optical stack of FIG. 14.

As illustrated in FIG. 14 the display device 100 comprises additional polariser 318 arranged on the output side of the output polariser 218. Additionally or alternatively the display device 100 may comprise additional polariser 318 and retarder 300 on the input side of the input polariser 210.

At least one retarder 300 is arranged between the output polariser 218 and the additional polariser 318 in the case the additional polariser 318 is arranged on the output side of the output polariser 218.

The at least one retarder 300 comprises a switchable liquid crystal retarder 301 comprising a layer 214 of liquid crystal material 213 and further comprises at least one passive compensation retarder 330. Reflective polariser 302 is arranged between the output polariser 218 and the at least one retarder 300.

Typical polarisers 210, 218, 318 may be polarisers such as dichroic polarisers. Reflective polariser 302 is arranged between the output polariser 218 and the additional polariser 318. Plural retarders 300 are arranged between the reflective polariser 302 and the additional polariser 318. In the embodiment of FIG. 14, the plural retarders 300 comprise

TABLE 4

| FIG. | Mode | Passive retarder(s) | | Active LC retarder | | | | | |
| --- | --- | --- | --- | --- | --- | --- | --- | --- | --- |
| | | Type | Δn.d/ nm | Alignment layers | Pretilt/ deg | Δn.d/ nm | Δε | Voltage/ V | LCD mode |
| — | Wide | Negative C | −300 ± 75 | Homogeneous | −2 | 400 ± 100 | 10.0 | 0 | Twisted |
| 13A | Privacy | Single A | 270+/−30 @ 67.5° | Homogeneous | 2 | | | 2.6 ± 0.2 | nematic |

The spatial light modulator 48 is a twisted nematic device. The spatial light modulator 48 comprises a surface alignment layer 217B disposed adjacent to the layer of liquid crystal material 213 on the side closest to the plural retarders 500 that is arranged to provide homogenous alignment in the adjacent liquid crystal material 213, there being a non-zero angle 227 between the alignment direction of the surface alignment layer 217B of the spatial light modulator 48 and the alignment direction of the surface alignment layer 517A of the switchable liquid crystal retarder 501 on the side closest to the spatial light modulator 48.

The display device 100 further comprises a half waveplate 580 arranged between the spatial light modulator 48 and the switchable liquid crystal retarder 501 and arranged to rotate a polarisation component of light incident thereon by said non-zero angle 227.

Advantageously display cost may be reduced. Further the alignment of the contrast profile may be aligned to provide lateral roll-off of contrast and into the upper off-axis viewing quadrants, while achieving a contrast profile in wide mode that is optimised for the twisted nematic liquid crystal mode.

It would be desirable to provide further increase of visual security level for snoopers in polar regions 540.

FIG. 14 is a schematic diagram illustrating in side perspective view a switchable privacy display 100 comprising a transmissive spatial light modulator 48, a switchable retarder 501 and a passive compensation retarder 530 arranged between crossed input polariser 210 and output polariser 218; and a reflective polariser 302, compensated passive retarder 330 and switchable liquid crystal retarder 301, but in general may be replaced by other configurations of at least one retarder.

The plural retarders 300 do not affect the luminance of light passing through the reflective polariser 302, the retarders 300 and the additional polariser 318 along an axis 199 along a normal to the plane of the retarders 300 but the retarders 300 do reduce the luminance of light passing therethrough along an axis inclined to a normal to the plane of the retarders 300, at least in one of the switchable states of the switchable retarder 301. The principles leading to this effect are described in greater detail below with reference to FIGS. 23A-D and arises from the presence or absence of a phase shift introduced by the retarders 300 to light along axes that are angled differently with respect to the liquid crystal material of the retarders 300.

In comparison to the plural retarders 500 and spatial light modulator 48 arranged between input polariser 210 and output polariser 218, the plural retarders 300 and additional polariser 318 achieve reduction of off-axis luminance but do not substantially change the off-axis contrast in privacy mode. Reduction of both luminance and contrast ratio for off-axis viewing positions advantageously achieves increased visual security level, VSL.

The substrates 312, 316 of the switchable liquid crystal retarder 301 comprise electrodes arranged to provide a voltage across the layer 314 of liquid crystal material 414. Control system 352 is arranged to control the voltage applied by voltage driver 350 across the electrodes of the switchable liquid crystal retarder 301.

The electric vector transmission direction of the reflective polariser 302 is parallel to the electric vector transmission direction of the output polariser 218. Further the electric vector transmission direction 303 of the reflective polariser 302 is parallel to the electric vector transmission direction 319 of the additional polariser 318. Passive retarder 330 comprises a retardation layer with material 430, while switchable liquid crystal retarder 301 comprises a layer 314 of liquid crystal material 414.

The plural retarders 300 and additional polariser 318 may be arranged to provide reduced size output luminance cone 402C in privacy mode in comparison to the cone 402D used for wide angle mode. Advantageously visual security levels are increased for off-axis snoopers.

The propagation of transmitted light rays from the output polariser 218 through the reflective polariser 302, plural retarders 300 and additional polariser 318 will now be discussed.

Figure 16A:
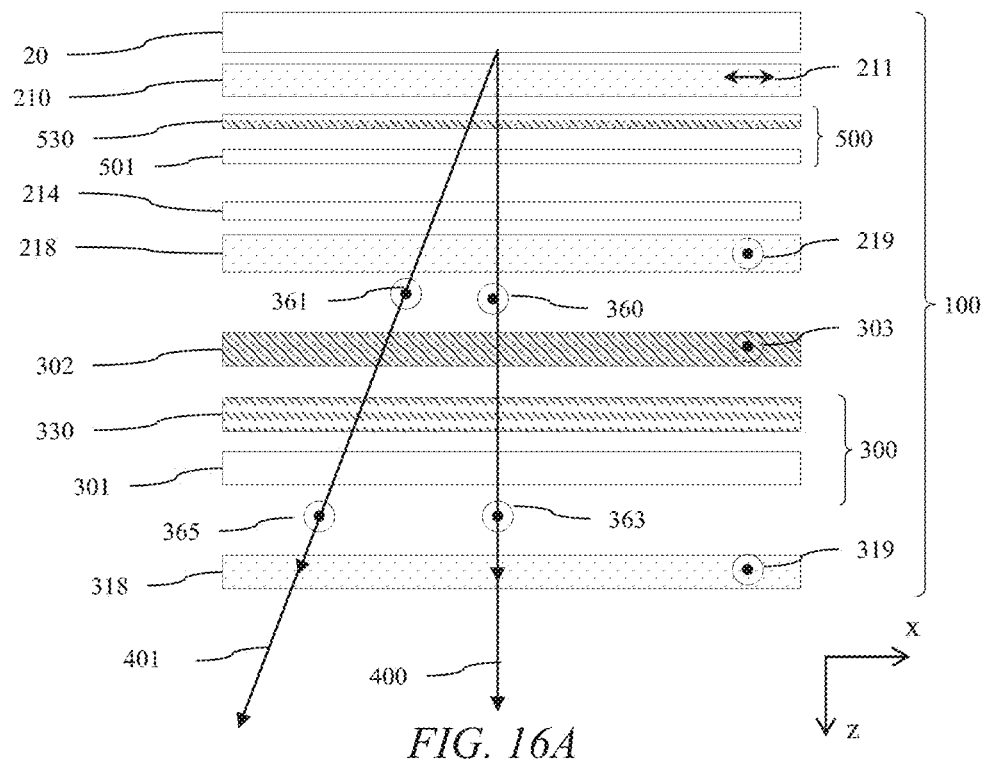
FIG. 16A is a schematic diagram illustrating in side view propagation of output light through the optical stack of FIG. 14 in a wide angle mode of operation.

FIG. 16A is a schematic diagram illustrating inside view propagation of output light through the optical stack of FIG. 14 in a wide angle mode of operation. Output polarisation state 360, 361 from output polariser 218 has the same linear polarisation component. The plural retarders 300 are arranged to provide substantially no modification of polarisation states 363, 365 for on-axis and off-axis rays respectively so that the output light is transmitted through additional polariser 318 for both rays 400, 401.

Figure 16B:
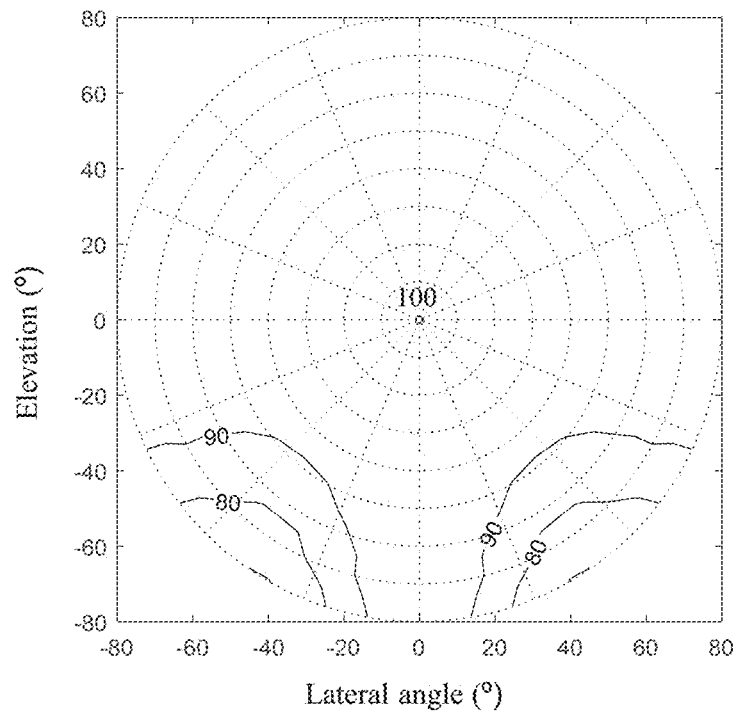
FIG. 16B is a schematic graph illustrating the variation of the transmission with polar direction for the transmitted light rays in FIG. 16A.

FIG. 16B is a schematic graph illustrating the variation of the transmission with polar direction for the transmitted light rays in FIG. 16A for the illustrative embodiment of TABLE 5. Advantageously the output luminance is substantially unmodified over a wide polar region so that the display may be provided with high contrast and high luminance for multiple users.

The operation of the reflective polariser 302 will now be described for wide angle mode.

Figure 17A:
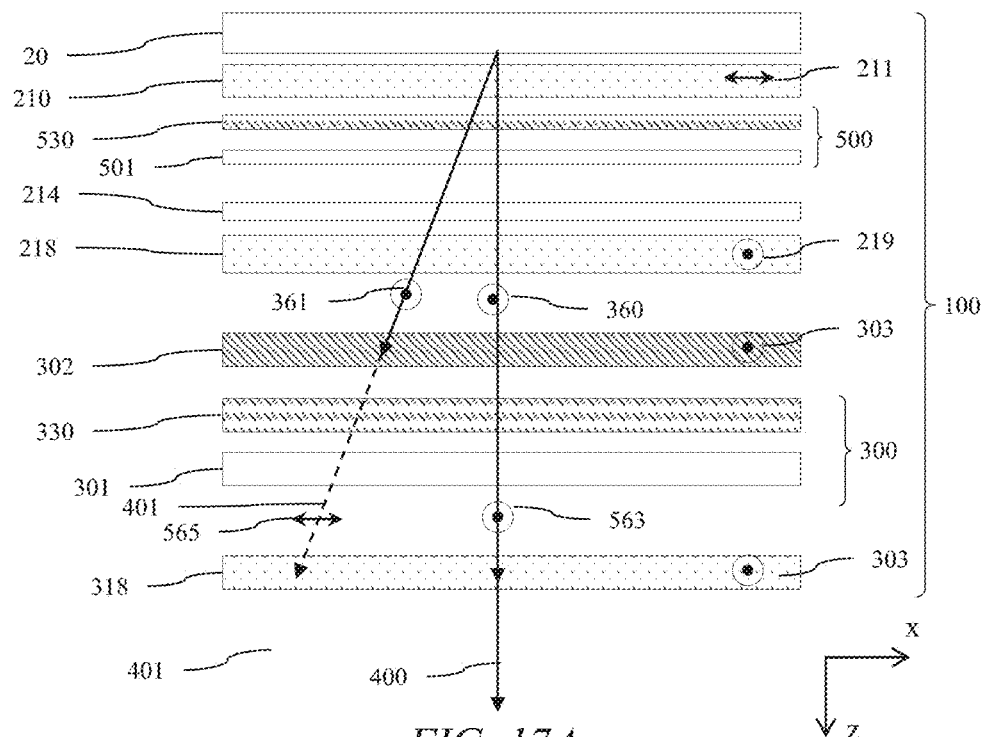
FIG. 17A is a schematic diagram illustrating in side view propagation of output light through the optical stack of FIG. 14 in a privacy mode of operation.
Figure 18A:
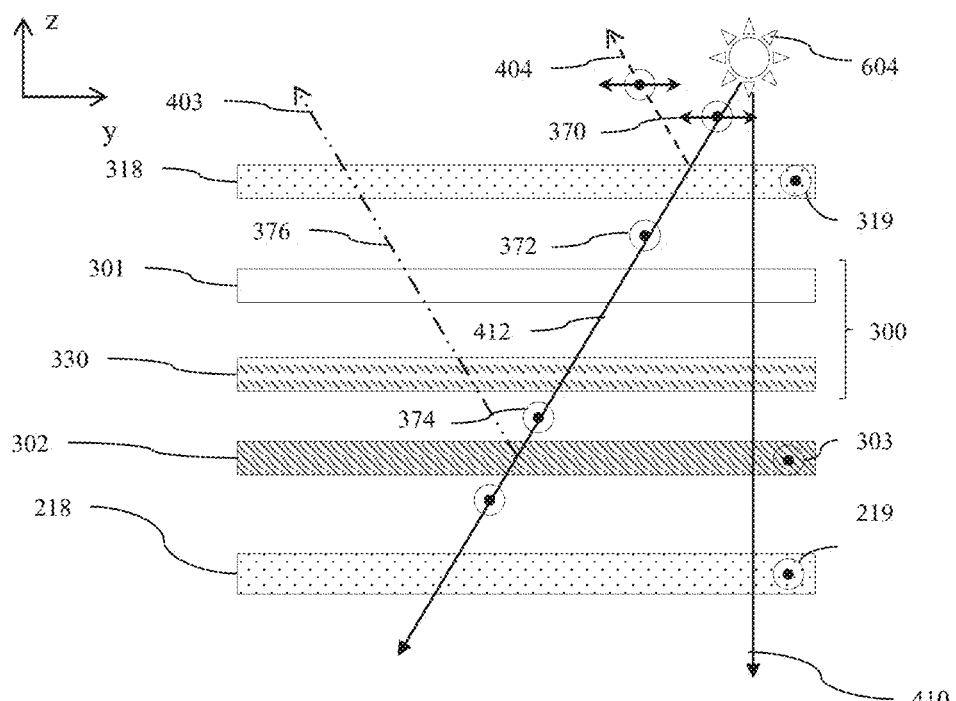
FIG. 18A is a schematic diagram illustrating in side view propagation of ambient light through the optical stack of FIG. 14 in a wide angle mode of operation.
Figure 18B:
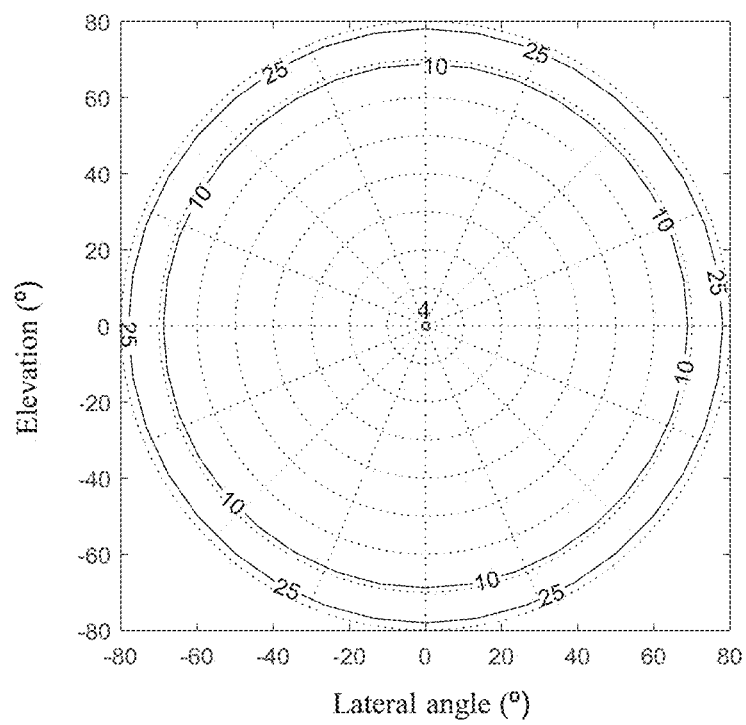
FIG. 18B is a schematic graph illustrating the variation of the reflection with polar direction for the transmitted light rays in FIG. 18A.

FIG. 18A is a schematic diagram illustrating in side view propagation of ambient light through the optical stack of FIG. 14 in a wide angle mode of operation. In comparison to FIGS. 4A, 4B, 7A, 7B, 16A and 17A, FIG. 18A considers the reflection of incident ambient light rays 410, 412; and FIG. 18B is a schematic graph illustrating the variation of the reflection with polar direction for the transmitted light rays in FIG. 18A.

Ambient light source 604 provides unpolarised light polarisation components 370 that are partially reflected as light rays 404 at the outer interface of the additional polariser 319.

When the liquid crystal retarder 301 is arranged for wide angle operation, the retarders 300 provide no overall transformation of polarisation component 372 to ambient light rays 410, 412 passing through the additional polariser 318 and then the retarder 300, that is perpendicular to the plane of the retarders 300 or at an acute angle to the perpendicular to the plane of the retarders 300.

In operation in the wide angle mode, input light rays 410 412 have polarisation state 372 after transmission through the additional polariser 318. For both head-on and off-axis directions no polarisation transformation occurs and thus the reflectivity for light rays 403 from the reflective polariser 302 is low. Light ray 412 is transmitted by reflective polariser 302 and lost in the display polarisers 218, 210 or the backlight 20 of FIG. 14.

Advantageously in a wide angle mode of operation, high contrast, high luminance and low reflectivity is provided across a wide field of view. Such a display can be conveniently viewed with high contrast by multiple observers.

TABLE 5

| FIG. | Mode | Passive retarder(s) | | | Active LC retarder | | | Voltage/ V |
| | | Type | Δn.d/ nm | Alignment layers | Pretilt/ deg | Δn.d/ nm | Δε | |
| --- | --- | --- | --- | --- | --- | --- | --- | --- |
| 16B | Wide | Negative C | −700 | Horneotropic | 88 | 810 | −4.3 | 0 |
| 17B | Privacy | | | Horneotropic | 88 | | | 2.2 |

FIG. 17A is a schematic diagram illustrating inside view propagation of output light through the optical stack of FIG. 14 in a privacy mode of operation. In comparison to FIG. 16A, the off-axis ray 401 provides an off-axis polarisation state 565 that for a given angle may provide a polarisation state orthogonal to the additional polariser 318, so that the off-axis luminance is minimised for a given optimisation angle and wavelength.

The polarisation modification of FIG. 17A is different to that illustrated in FIG. 7A of the present embodiments. In FIG. 7A it is desirable to provide a 1:1 contrast ratio, so the 'white' transmission state of ray 401 is reduced to 50% and in FIG. 7B the 'black' transmission state of ray 401 is increased to 50%. In FIG. 17A, the luminance is reduced, preferably to a minimum value at a design angle.

Figure 17B:
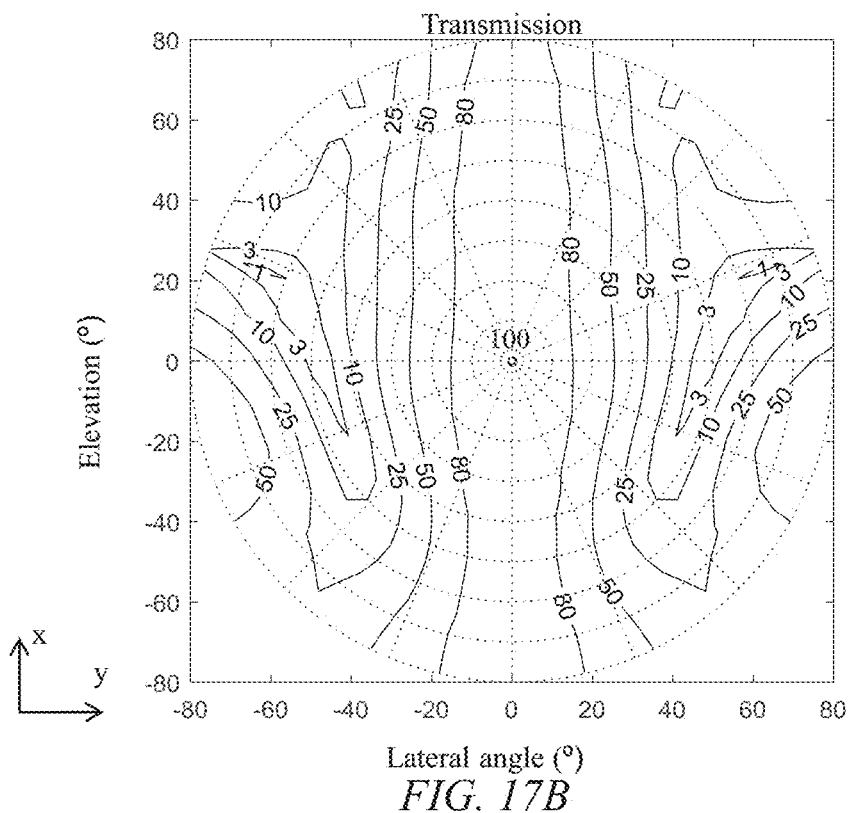
FIG. 17B is a schematic graph illustrating the variation of the transmission with polar direction for the transmitted light rays in FIG. 17A.

FIG. 17B is a schematic graph illustrating the variation of the transmission with polar direction for the transmitted light rays in FIG. 17A for the illustrative embodiment of TABLE 2. Advantageously off-axis transmission for ray 401 is reduced in privacy mode. The off-axis luminance reduction cooperates with the off-axis contrast reduction of FIG. 8C to achieve reduced image visibility to a snooper.

It would be desirable to provide further improvement of visual security level in privacy mode. The operation of the reflective polariser 302 will now be described for privacy mode.

Figure 19A:
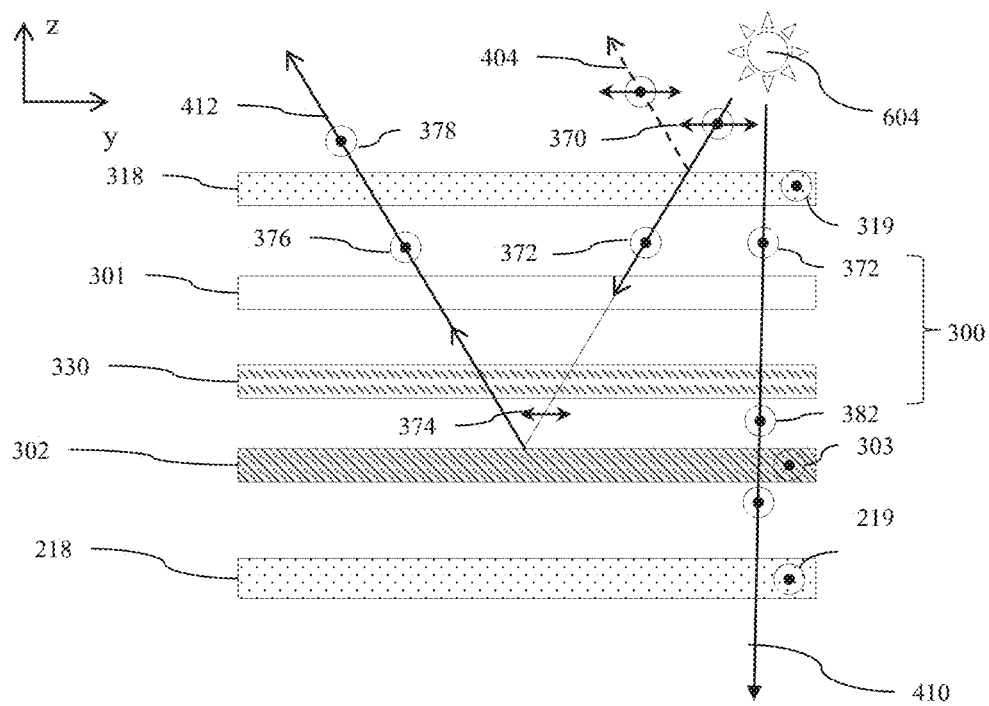
FIG. 19A is a schematic diagram illustrating in side view propagation of ambient light through the optical stack of FIG. 14 in a privacy mode of operation.
Figure 19B:
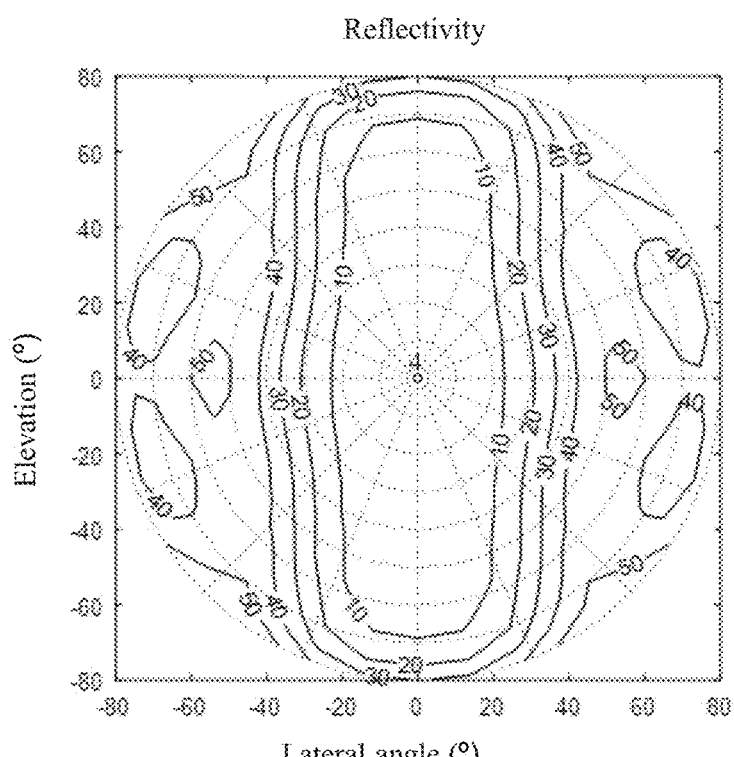
FIG. 19B is a schematic graph illustrating the variation of the reflection with polar direction for the transmitted light rays in FIG. 19A.

FIG. 19A is a schematic diagram illustrating in side view propagation of ambient light through the optical stack of FIG. 14 in a privacy mode of operation; and FIG. 19B is a schematic graph illustrating the variation of the reflection with polar direction for the transmitted light rays in FIG. 19A.

Ambient light source 604 illuminates the display 100 with unpolarised light 370. Additional polariser 318 transmits light ray 410 normal to the display 100 front surface with a first polarisation component 372 that is a linear polarisation component parallel to the electric vector transmission direction 319 of the additional polariser 318.

The polarisation component 372 remains unmodified by the retarders 300 and so transmitted polarisation component 382 is parallel to the transmission axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 is reflected. Such polarisation component is re-converted into component 376 after passing through retarders 300 and is transmitted through the additional polariser 318.

When the layer 314 of liquid crystal material is in the privacy mode, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 19B thus illustrates that high reflectivity can be provided at typical snooper locations by means of the privacy state of the retarders 300. Thus, in the privacy mode of operation, the reflectivity for off-axis viewing positions is increased, and the luminance for off-axis light from the spatial light modulator is reduced as illustrated in FIG. 18B.

Advantageously, a privacy display is provided that has high reflectivity to an off-axis snooper while maintaining low reflectivity for an on-axis observer. Such increased reflectivity provides enhanced privacy performance for the display in an ambiently illuminated environment.

It would be desirable to provide increased visual security levels in privacy mode by reduction of off-axis luminance in combination with the reduced off-axis contrast ratio of the present embodiments.

Figure 20A:
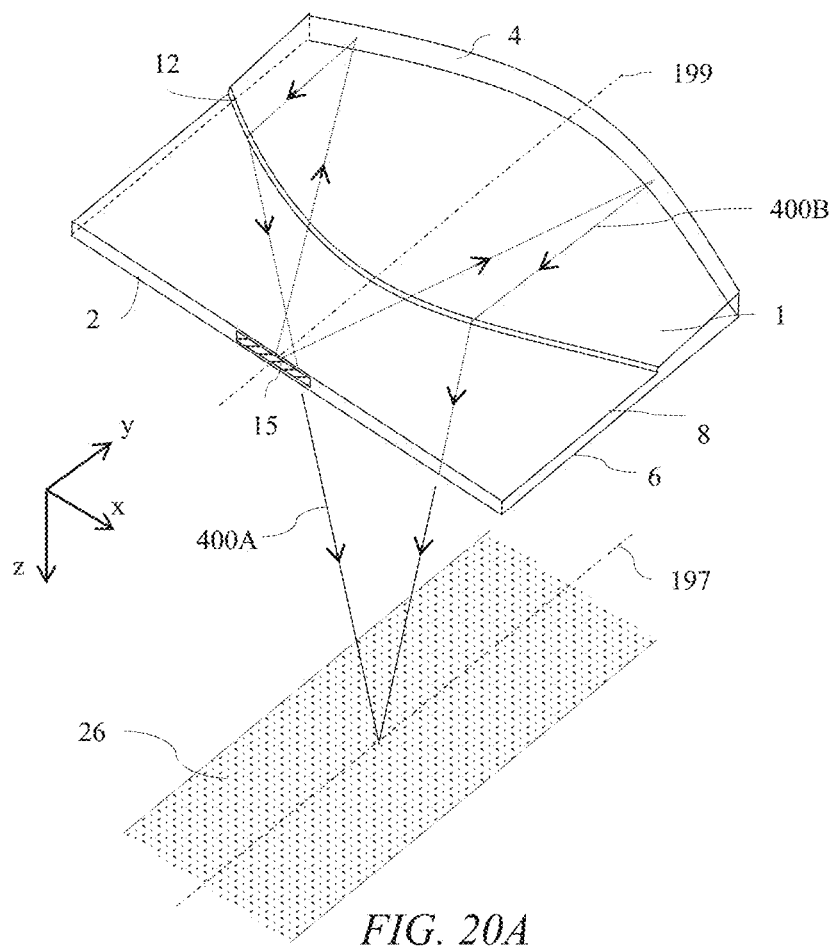
FIG. 20A is a schematic diagram illustrating a rear perspective view of operation of an imaging waveguide in a narrow angle mode of operation.

FIG. 20A is a schematic diagram illustrating a rear perspective view operation of an imaging waveguide 1 in a narrow angle mode of operation and formation of an off-axis optical window 26.

Imaging waveguides are described in U.S. Pat. Nos. 9,519,153 and 10,054,732, both of which are herein incorporated by reference in their entireties.

Light rays 400A, 400B provided by input set 15 of light sources are directed to reflective end 4, and directed within the waveguide 1 to extraction feature 12 by means of total internal reflection within the waveguide 1. The waveguide 1 comprises a light input surface 2 extending along a first end of the directional waveguide 1, and a reflective end 4 extending along a second end of the directional waveguide 1 opposite to the first end 2 for reflecting the input light back along the waveguide 1, the reflective end 4 having positive optical power in the lateral direction. The second guide surface 8 comprises light extraction features 12 and intermediate regions 10 between the light extraction features 12, the light extraction features 12 being oriented to deflect the reflected input light 400A, 400B through the first guide surface 6 as output light and the intermediate regions 10 being arranged to direct light through the waveguide 1 without extracting it.

As illustrated in FIG. 20A, the light extraction features may have positive optical power in the lateral direction, such optical power cooperates with the optical power of the curved reflective end 4 to provide imaging of the set 15 of light sources. After reflection rays 400A, 400B are directed in the z-direction to optical window 26 in the window plane 106. Optical window 26 is an image in the lateral direction (x-axis) of the set 15 of light sources.

The second guide surface 8 is thus arranged to deflect the reflected input light 400A, 400B through the first guide 6 surface as output light, and the waveguide 1 is arranged to image the set 15 of light sources in the lateral direction so that the output light from the light sources is directed into respective optical windows 26 in output directions that are distributed in dependence on input positions of the light sources of the set 15 of light sources.

Figure 20B:
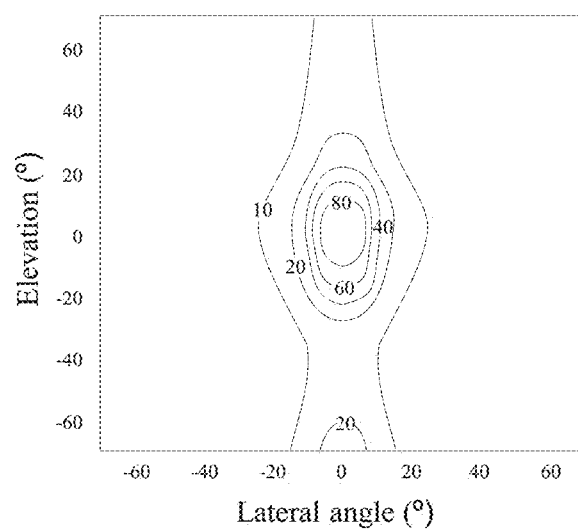
FIG. 20B is a schematic graph illustrating field-of-view luminance plot of the output of FIG. 20A when used in a display apparatus.

FIG. 20B is a schematic graph illustrating field-of-view luminance plot of the output of FIG. 20A when used in a display apparatus with no switchable liquid crystal retarder 300 and additional polariser 318, where luminance contour lines are illustrated.

Advantageously relatively low levels of off-axis luminance may be achieved for off-axis viewing systems, achieved by the imaging of the waveguide 1. For example less than 5% of head-on luminance at a lateral angle of 45 degrees and elevation of 0 degrees may be provided.

Such a waveguide has a thickness that is limited by the height of the light sources and efficiency determined by the relative height of the reflective end 4 and input end 2. It would be desirable to provide reduced thickness.

Figure 20C:
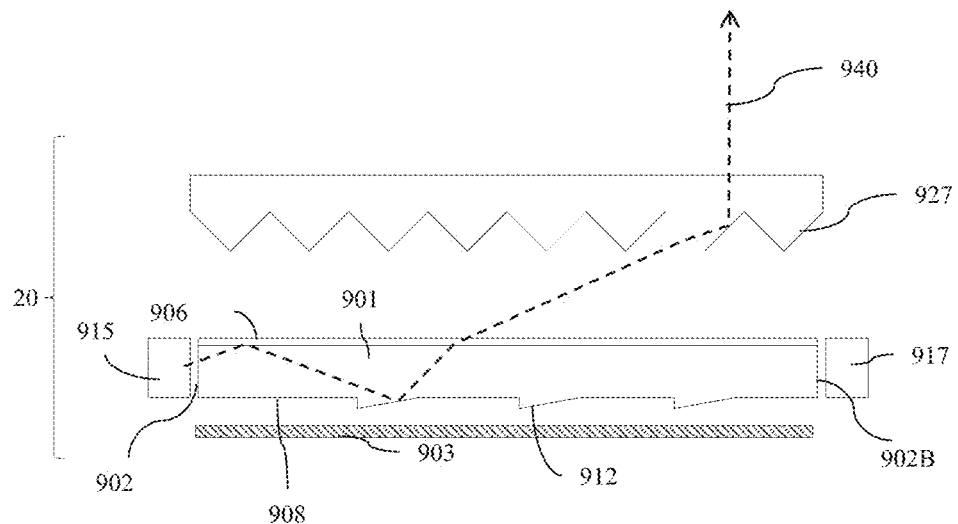
FIG. 20C is a schematic diagram illustrating side view of a backlight comprising collimating waveguide.
Figure 20D:
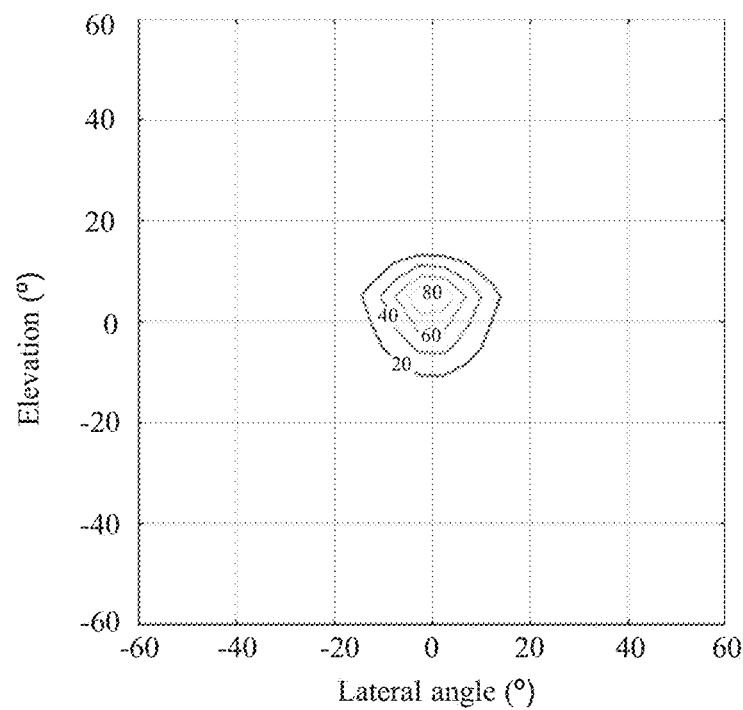
FIG. 20D is a schematic graph illustrating field-of-view luminance plot of the output of FIG. 20C when used in a display apparatus.

FIG. 20C is a schematic diagram illustrating side view of a backlight comprising collimating waveguide; and FIG. 20D is a schematic graph illustrating field-of-view luminance plot of the output of FIG. 20C.

Directional backlight 20 comprises a collimating waveguide 901 with first and second opposing guide surfaces. A plurality of elongate lenticular elements 906 is arranged on the first guide surface of the waveguide 901. The lenticular elements 906 have extended cylindrical lens shapes that extend away from end 902 of the waveguide 901.

A plurality of inclined light extraction features 912 arranged in an array on the second guide surface of the waveguide 901 opposite the first guide surface with planar light guiding surface 908 between light deflecting features 912

Input light sources 915 are arranged at the end 902. The plurality of elongate lenticular elements 906 and the plurality of inclined light extraction features 912 are oriented to deflect input light rays 940 guided through the directional waveguide 901 to exit through the first guide surface of the waveguide 901.

Light ray 940 from illumination source 915 is guided within the waveguide 901 and output towards turning film 927 either by transmission through the lenticular surface 906 or by reflection from the reflector 903 after exiting planar surfaces 908. Output light rays 950 from the waveguide 901 are deflected by total internal reflection in the turning film 927 and are incident onto the optical stack 548 of the display 100.

In comparison to the arrangement of FIG. 20A, thickness may be advantageously reduced.

In the present embodiments, the backlight 20 may be arranged to provide an angular light distribution that has reduced luminance for off-axis viewing positions in comparison to head-on luminance. A typical wide angle backlight has a roll-off at higher angles such that the full width half maximum of relative luminance may be preferably greater than 40°, more preferably greater than 60° and most preferably greater than 80°.

The backlight 20 may be a directional backlight that provides a luminance at polar angles to the normal to the spatial light modulator 48 greater than 45 degrees that is at most 30% of the luminance along the normal to the spatial light modulator 48, preferably at most 20% of the luminance along the normal to the spatial light modulator 48, and more preferably at most 10% of the luminance along the normal to the spatial light modulator 48. In an illustrative embodiment of FIG. 1A, the luminance at polar angles to the normal to the spatial light modulator 48 greater than 45 degrees may be at most 18%.

Backlight 20 may further comprise a switchable backlight arranged to switch the output angular luminance profile in order to provide reduced off-axis luminance in a privacy mode of operation and higher off-axis luminance in a wide angle mode of operation. Such a directional backlight provides some off-axis luminance reduction, advantageously increasing head-on efficiency and reducing display visibility and stray light for off-axis locations.

Figure 21:
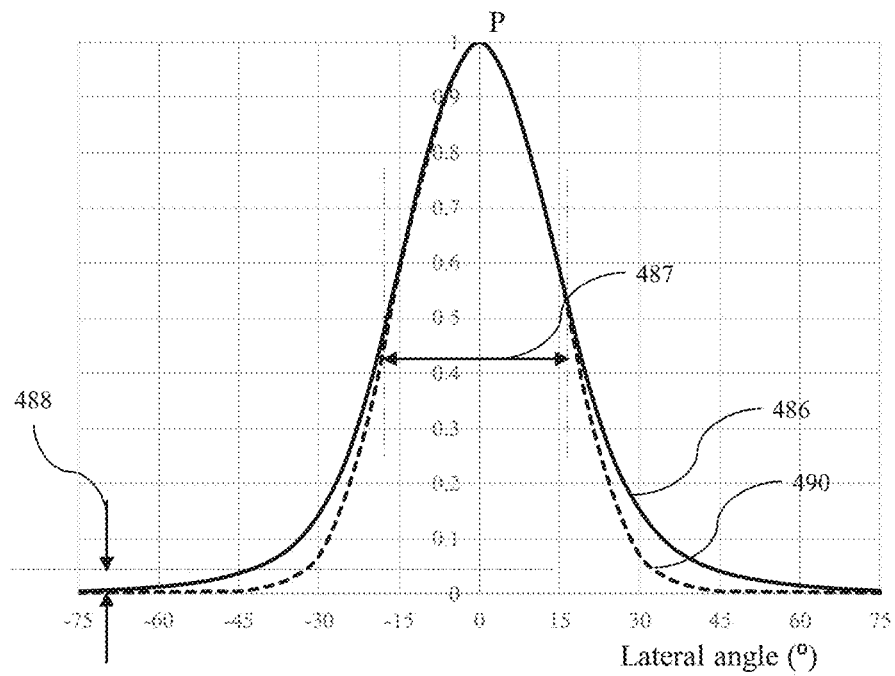
FIG. 21 is a schematic graph illustrating the variation of the relative output luminance with lateral direction for the output of a luminance controlled directional display.

FIG. 21 is a schematic graph illustrating the variation of the relative output luminance, P with lateral direction for the output of a luminance controlled directional display of FIG. 14. In the present disclosure, the relative luminance, P may be referred to as the privacy level. Privacy level is different to the visual security level, as the privacy level is a measure of relative luminance only and does not include the effects of image contrast and display reflectivity on the image seen by a snooper.

In operation, the profile 486 may be provided in wide angle mode, while the profile 490 may be provided by the display in privacy mode. The privacy level 488 at a lateral viewing angle of 45 degrees is 5% in the present illustrative embodiment for wide angle mode and 0.5% for privacy mode, after applying a voltage to the switchable liquid crystal retarder 302 of FIG. 14. Advantageously, increased off-axis visual security level is provided in comparison to wide angle operation.

The variation of visual security level with privacy level, P and image contrast, C will now be discussed.

Figure 22A:
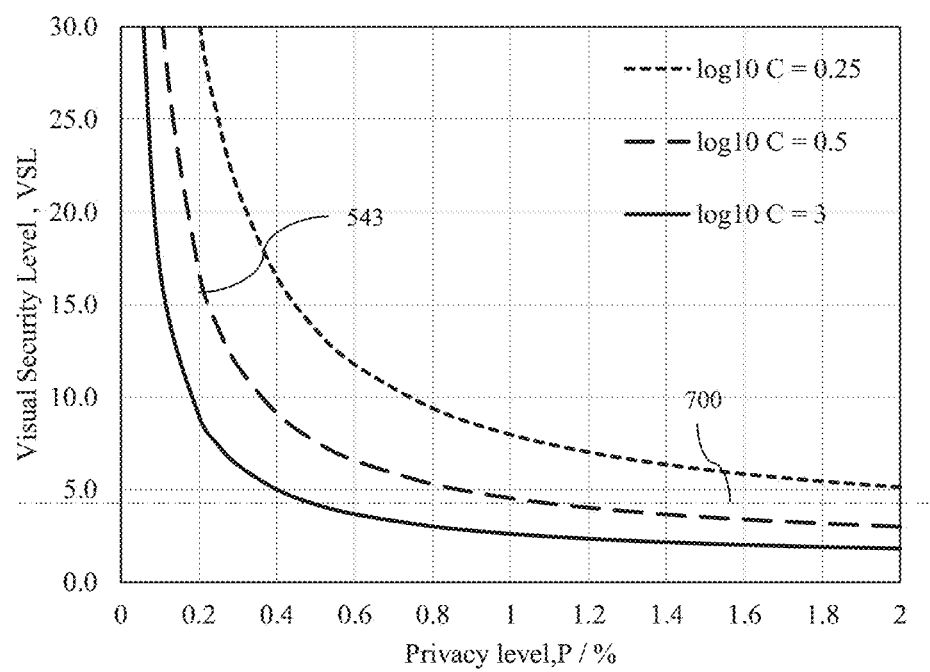
FIG. 22A is a schematic graph illustrating the variation of the visual security level with privacy level for different image contrast ratios.

FIG. 22A is a schematic graph illustrating the variation of the visual security level, VSL with privacy level, P for different image contrast ratios, C with illustrative embodiment of TABLE 6 in which the reflective polariser 302 of FIG. 14 is omitted.

TABLE 6

| FIGURE | Display reflectivity | Head-on luminance/nits | Ambient illuminance/lux |
|---|---|---|---|
| 22A, 22B | 5% | 100 | 100 |
| 22C | 30% | 100 | 100 |

Considering again FIG. 8A, the contrast over the polar range in which a snooper may be able to see the image may vary with polar location, so that while some angles will have very low image contrast to a snooper, other areas will have contrast ratios different to 1:1 and $\log_{10}$ contrast of 0.

FIG. 22A illustrates the effect of image contrast ratio with location in the polar region of the snooper. Thus contour 543 is represented by profile for $\log_{10}$ C=0.5.

To achieve a desirable threshold visual security level 700 of 4.0, a privacy level of 0.5% is provided for high contrast images (1000:1) whereas a privacy level of 1.1% may be provided if the contrast is 3:1, and greater than 2% for contrast ratios closer to 1.0. Advantageously the present embodiments achieve desirable visual security levels for higher off-axis luminance. Further the present embodiments achieve increased visual security level, VSL for a given privacy level, P.

Figure 22B:
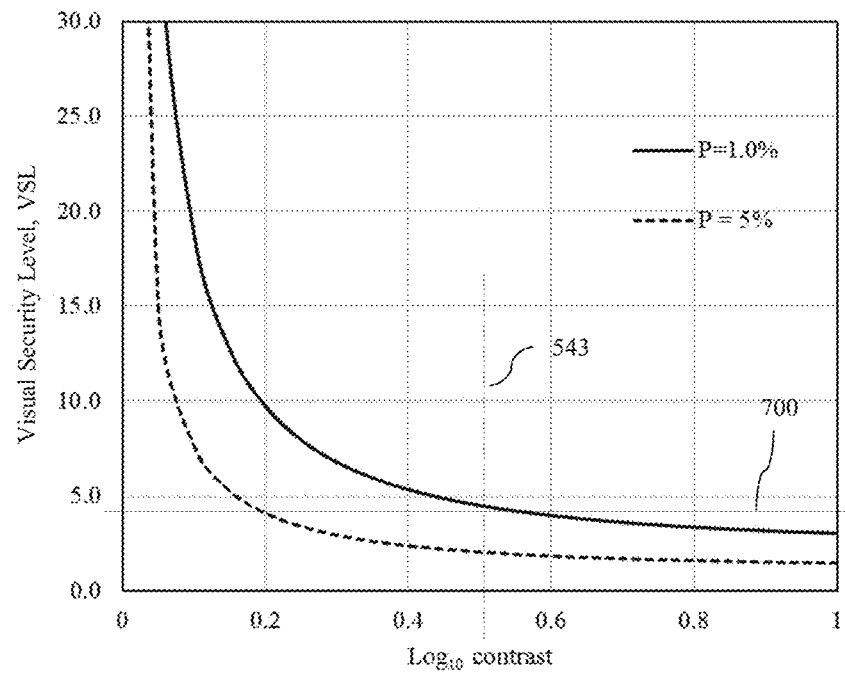
FIG. 22B is a schematic graph illustrating the variation of the visual security level with the logarithm of image contrast for different privacy levels for a display incorporating no reflective polariser between the output polariser and additional polariser.

FIG. 22B is a schematic graph illustrating the variation of the visual security level, VSL with the logarithm of image contrast, C for different privacy levels, P for a display of FIG. 14 but with no reflective polariser 302 between the output polariser 218 and additional polariser 318.

Thus for desirable threshold visual security level 700 of 4.0, polar regions with contrast C<1.6:1 are provided if the privacy level is 5% (for example as may be provided by collimated backlights omitting retarder 300 and additional polariser 318). By adding at least one retarder 300 and additional polariser 318, privacy level, P of the display may be 1.0% or less, so that polar regions with contrast ratio $\log_{10}$ C=0.6 (C<4:1) may provide desirable visual security level, VSL above threshold 700. Advantageously the polar region over which a snooper experiences desirable VSL is increased while display cost and complexity is reduced in comparison to displays with luminance reduction only.

The effect of reflective polariser 302 on visual security level will now be described further.

Figure 22C:
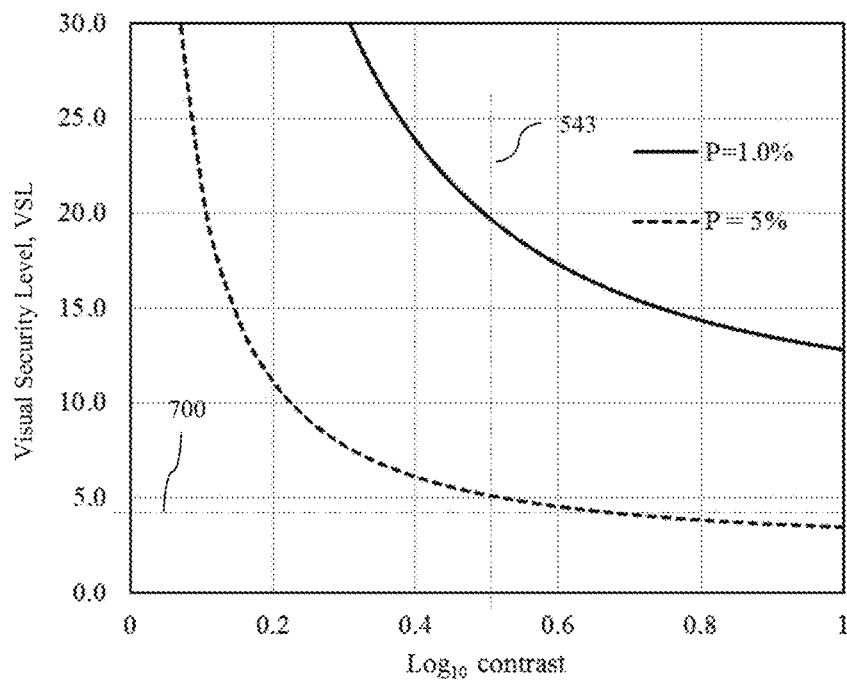
FIG. 22C is a schematic graph illustrating the variation of the visual security level with the logarithm of image contrast for different privacy levels for a display incorporating a reflective polariser between the output polariser and additional polariser.

FIG. 22C is a schematic graph illustrating the variation of the visual security level with the logarithm of image contrast for different privacy levels for a display of FIG. 14 incorporating a reflective polariser 302 between the output polariser 218 and additional polariser 318 and as described in the illustrative embodiment of TABLE 6.

In comparison to the arrangement of FIG. 22B, the Visual Security Level, VSL of the display is substantially increased for each privacy level, P. Advantageously the display 100 may have significantly lower visibility to an off-axis snooper over an extended polar region. The primary user may perceive high image quality for head-on use.

A description of the operation of plural retarders 500 and retarders 300 will now be given in more detail, the principles of which may be applied in general to all of the devices described above. In various devices described above, plural retarders 500 are arranged between the input polariser 210 and the output polariser 218 in various different configurations. In each case, the plural retarders are configured so that they do not affect the transmission of light for a white state pixel along an axis along a normal to the plane of the retarder(s) but it does reduce the transmission of light along an axis inclined to a normal to the plane of the retarder(s), at least in one of the switchable states of the plural retarders 500. Further the plural retarders 500 are configured so that they do not affect the transmission of light for a black state pixel along an axis along a normal to the plane of the retarder(s) but it does increase the transmission of light along an axis inclined to a normal to the plane of the retarder(s), at least in one of the switchable states of the plural retarders 500.

The operation of the present off-axis contrast reducing embodiments may be considered in a similar manner to the operation of retarders between parallel polarisers as will be described further below. In the present embodiments a contrast modification for off-axis viewing locations is achieved by modification of the polarisation states representing black and white pixel states, due to the angular variation in optical phase in the plural retarders and liquid crystal spatial light modulator 48. Intermediate grey level states of image pixels may be considered as combinations of black and white pixels.

In various devices described above, plural retarders 300 are arranged between a display polariser 210 or 218 and an additional polariser 318 in various different configurations.

In each case, the retarders 300 are configured so that they do not affect the luminance of light along an axis along a normal to the plane of the retarder(s) but it does reduce the luminance of light along an axis inclined to a normal to the plane of the retarder(s), at least in one of the switchable states of the switchable retarder 301.

There will now be given a description of this effect in more detail, the principles of which may be applied in general to all of the devices described above.

Figure 23A:
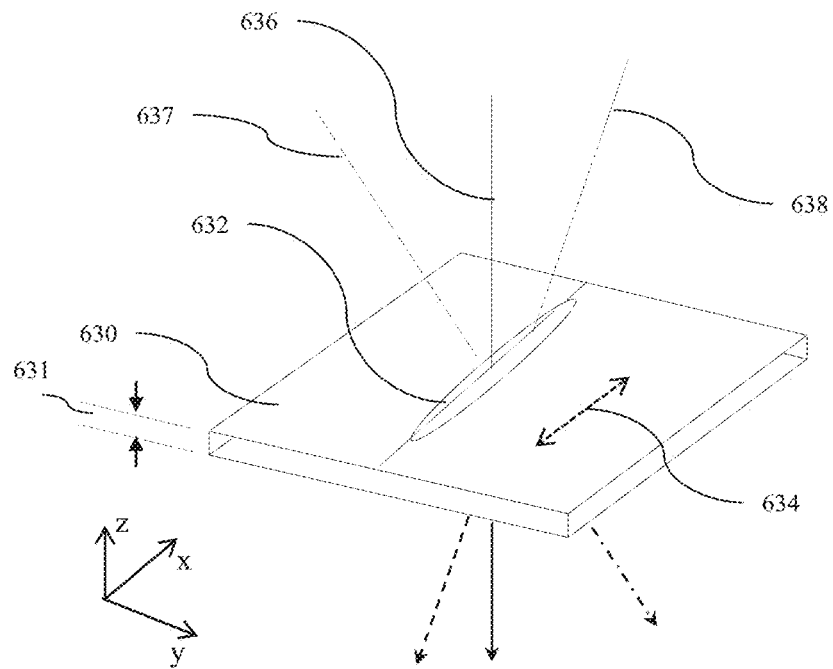
FIG. 23A is a schematic diagram illustrating in perspective view illumination of a retarder layer by off-axis light.

FIG. 23A is a schematic diagram illustrating in perspective view illumination of a retarder layer by off-axis light. Correction retarder 630 may comprise birefringent material, represented by refractive index ellipsoid 632 with optical axis direction 634 at 0 degrees to the x-axis, and have a thickness 631. Normal light rays 636 propagate so that the path length in the material is the same as the thickness 631. Light rays 637 are in the y-z plane have an increased path length; however the birefringence of the material is substantially the same as the rays 636. By way of comparison light rays 638 that are in the x-z plane have an increased path length in the birefringent material and further the birefringence is different to the normal ray 636.

The retardance of the retarder 630 is thus dependent on the angle of incidence of the respective ray, and also the plane of incidence, that is rays 638 in the x-z will have a retardance different from the normal rays 636 and the rays 637 in the y-z plane.

The interaction of polarized light with the retarder 630 will now be described. To distinguish from the first and second polarization components during operation in a directional backlight 101, the following explanation will refer to third and fourth polarization components.

Figure 23B:
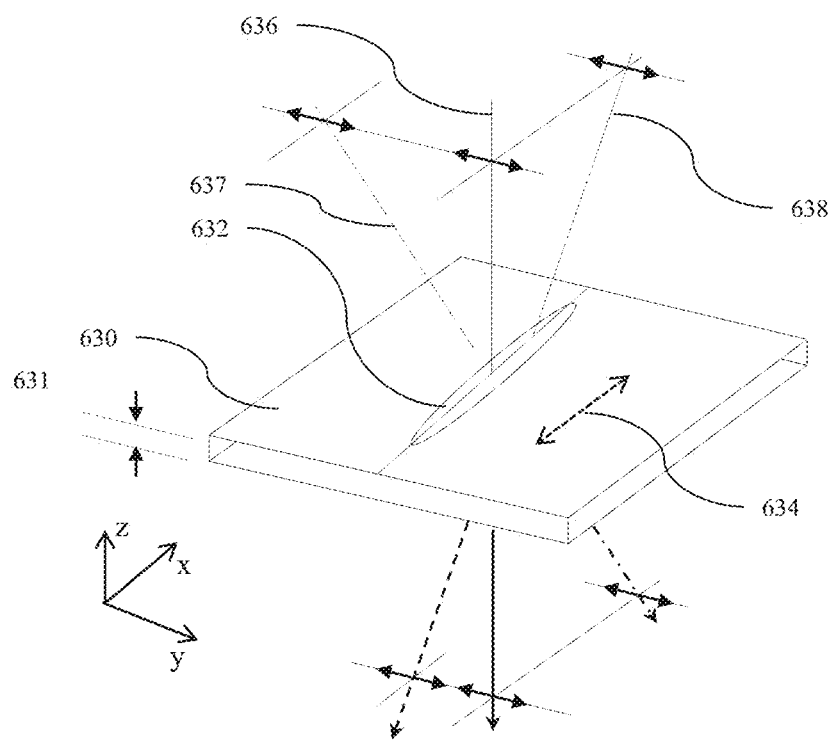
FIG. 23B is a schematic diagram illustrating in perspective view illumination of a retarder layer by off-axis light of a linear polarization state at 90 degrees.
Figure 23C:
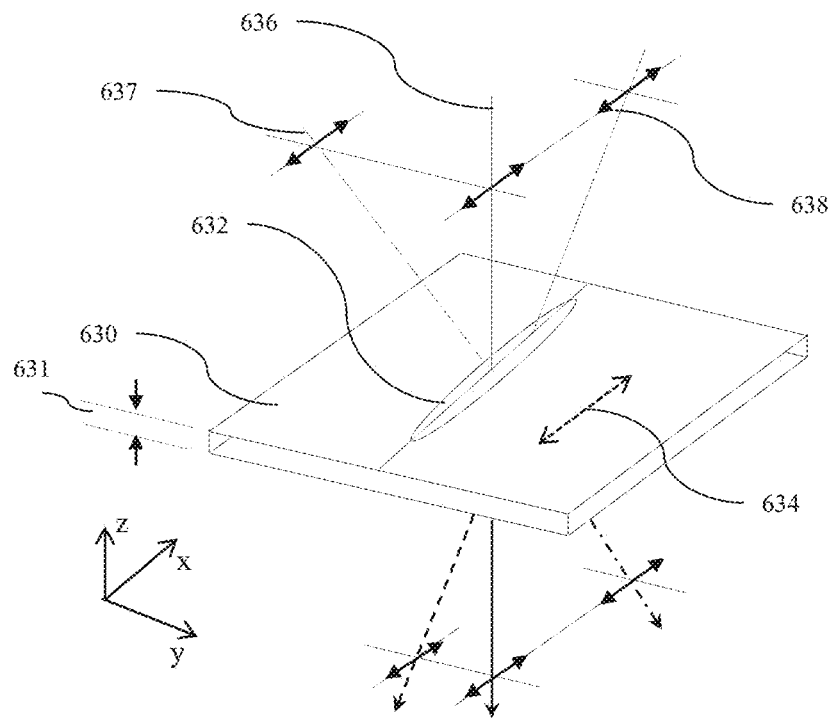
FIG. 23C is a schematic diagram illustrating in perspective view illumination of a retarder layer by off-axis light of a linear polarization state at 0 degrees.

FIG. 23B is a schematic diagram illustrating in perspective view illumination of a retarder layer by off-axis light of a third linear polarization state at 90 degrees to the x-axis and FIG. 23C is a schematic diagram illustrating in perspective view illumination of a retarder layer by off-axis light of a fourth linear polarization state at 0 degrees to the x-axis. In such arrangements, the incident linear polarization states are aligned to the optical axes of the birefringent material, represented by ellipse 632. Consequently, no phase difference between the third and fourth orthogonal polarization components is provided, and there is no resultant change of the polarization state of the linearly polarized input for each ray 636, 637, 638. Thus, the retarder 630 introduces no phase shift to polarisation components of light passed by the polariser on the input side of the retarder 630 along an axis along a normal to the plane of the retarder 630. Accordingly, the retarder 630 does not affect the luminance of light passing through the retarder 630 and polarisers (not shown) on each side of the retarder 630. Although FIGS. 29A-C relate specifically to the retarder 630 that is passive, a similar effect is achieved by the retarders in the devices described above.

Figure 23D:
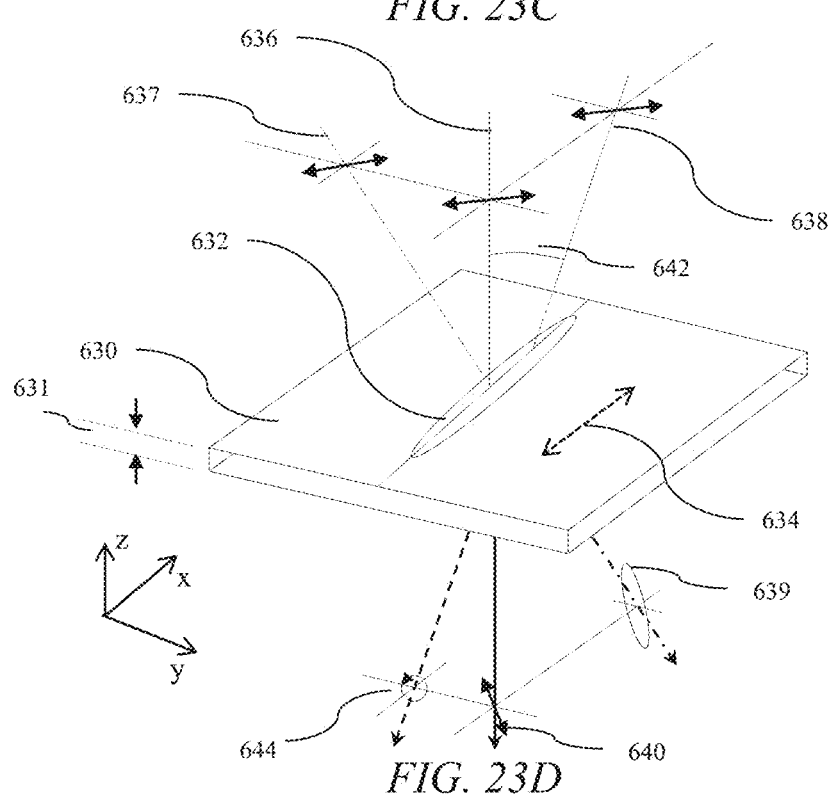
FIG. 23D is a schematic diagram illustrating in perspective view illumination of a retarder layer by off-axis light of a linear polarization state at 45 degrees.

FIG. 23D is a schematic diagram illustrating in perspective view illumination of a retarder 630 layer by off-axis light of a linear polarization state at 45 degrees. The linear polarization state may be resolved into third and fourth polarization components that are respectively orthogonal and parallel to optical axis 634 direction. The retarder thickness 631 and material retardance represented by refractive index ellipsoid 632 may provide a net effect of relatively shifting the phase of the third and fourth polarization components incident thereon in a normal direction represented by ray 636 by half a wavelength, for a design wavelength. The design wavelength may for example be in the range of 500 to 550 nm.

At the design wavelength and for light propagating normally along ray 636 then the output polarization may be rotated by 90 degrees to a linear polarization state 640 at −45 degrees. Light propagating along ray 637 may see a phase difference that is similar but not identical to the phase difference along ray 637 due to the change in thickness, and thus an elliptical polarization state 639 may be output which may have a major axis similar to the linear polarization axis of the output light for ray 636.

By way of contrast, the phase difference for the incident linear polarization state along ray 638 may be significantly different, in particular a lower phase difference may be provided. Such phase difference may provide an output polarization state 644 that is substantially circular at a given inclination angle 642. Thus, the retarder 630 introduces a phase shift to polarisation components of light passed by the polariser on the input side of the retarder 630 along an axis corresponding to ray 638 that is inclined to a normal to the plane of the retarder 630. Although FIG. 23D relates to the retarder 630 that is passive, a similar effect is achieved by the retarders described above, in a switchable state of the switchable liquid crystal retarder corresponding to the privacy mode.

To illustrate the off-axis behaviour of retarder stacks, the angular luminance control of C-plates 308A, 308B between an additional polariser 318 and output display polariser 218 will now be described for various off-axis illumination arrangements with reference to the operation of a C-plate between the parallel polarisers 500, 210 will now be described.

Figure 24A:
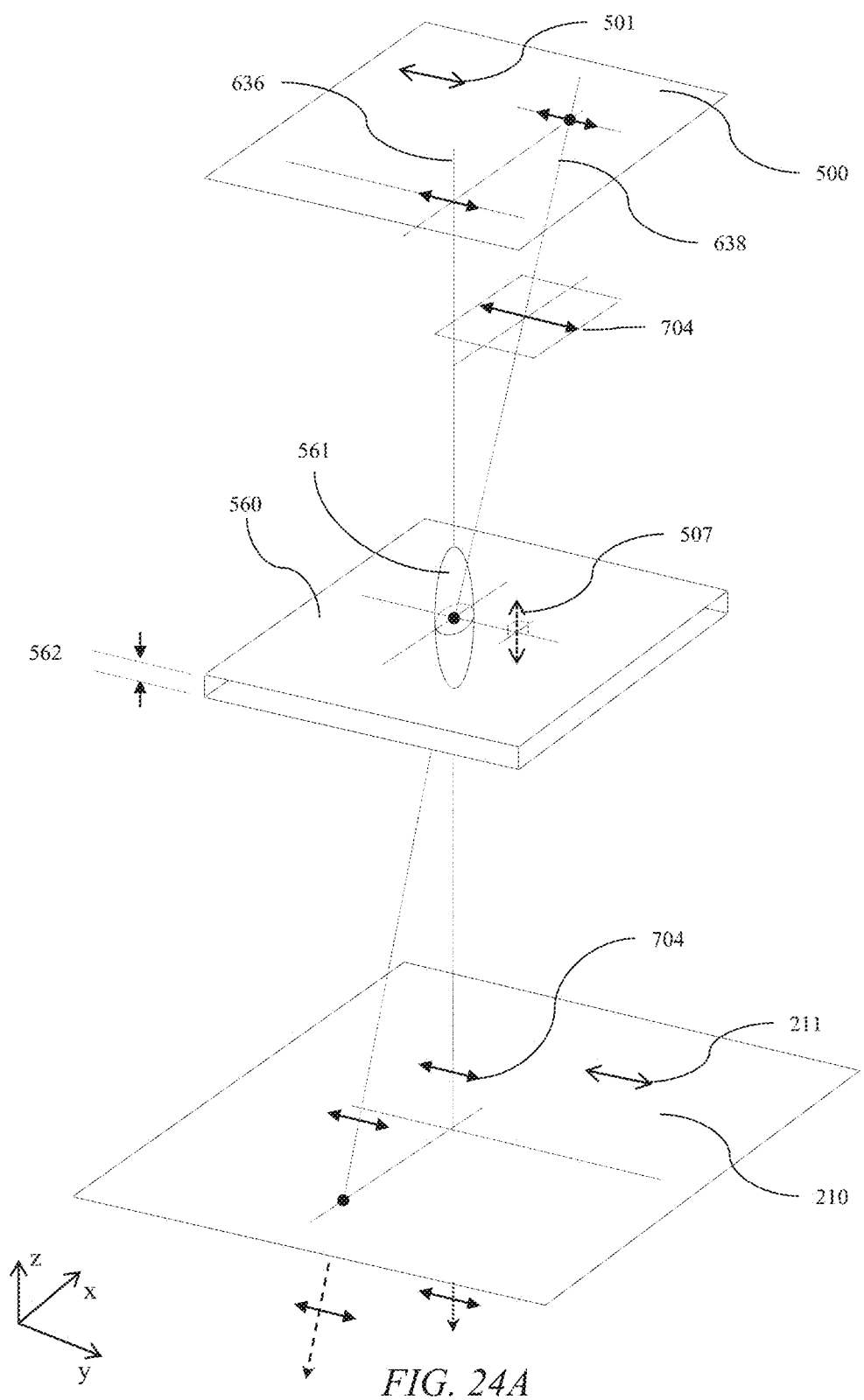
FIG. 24A is a schematic diagram illustrating in perspective view illumination of a C-plate retarder by off-axis polarised light with a positive elevation.

FIG. 24A is a schematic diagram illustrating in perspective view illumination of a C-plate layer by off-axis polarised light with a positive elevation. Incident linear polarisation component 704 is incident onto the birefringent material 632 of the retarder 560 that is a C-plate with optical axis direction 507 that is perpendicular to the plane of the retarder 560. Polarisation component 704 sees no net phase difference on transmission through the liquid crystal molecule and so the output polarisation component is the same as component 704. Thus a maximum transmission is seen through the polariser 210. Thus the retarder 560 having an optical axis 561 perpendicular to the plane of the retarder 560, that is the x-y plane. The retarder 560 having an optical axis perpendicular to the plane of the retarder comprises a C-plate.

Figure 24B:
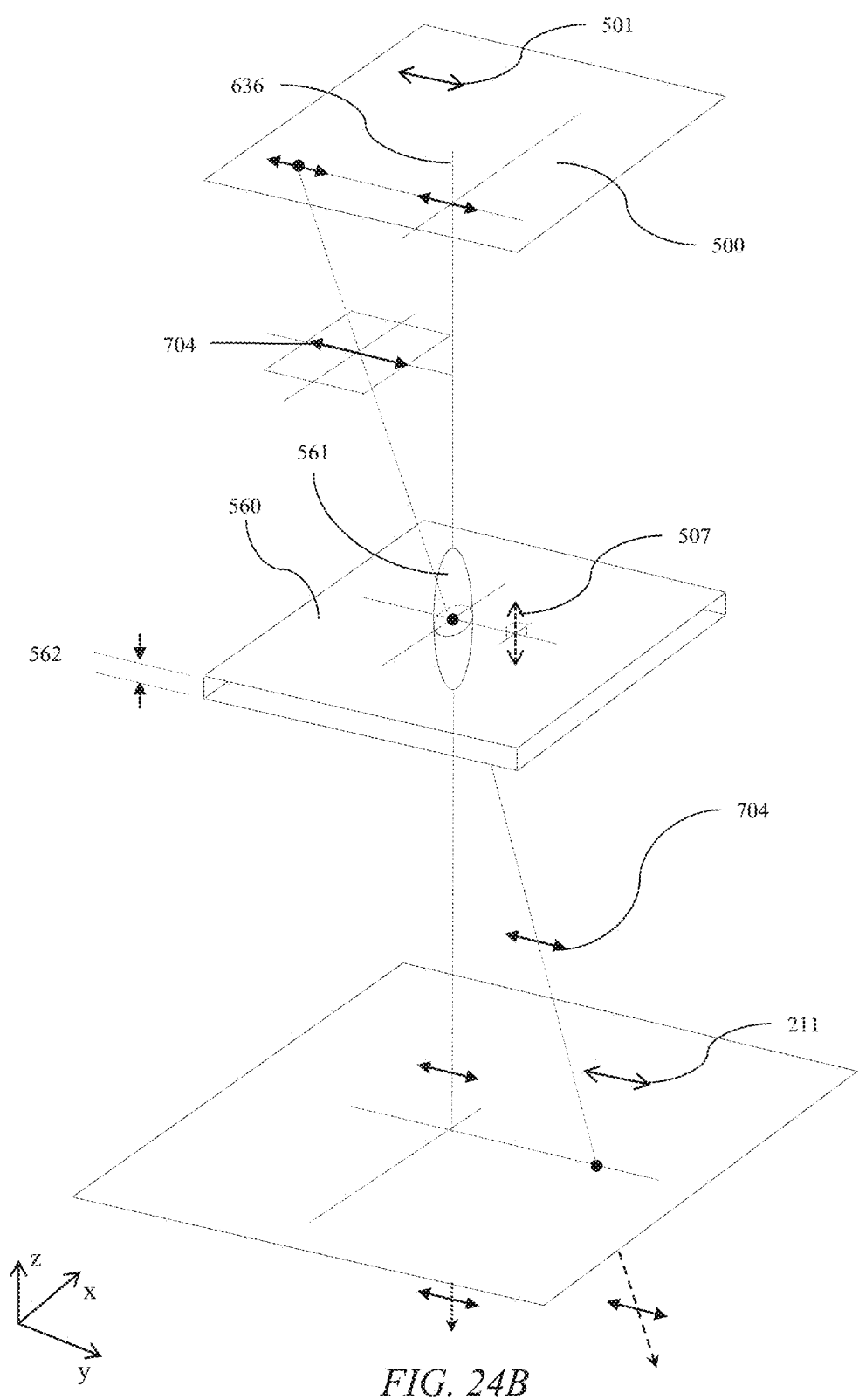
FIG. 24B is a schematic diagram illustrating in perspective view illumination of a C-plate retarder by off-axis polarised light with a negative lateral angle.

FIG. 24B is a schematic diagram illustrating in perspective view illumination of a C-plate layer by off-axis polarised light with a negative lateral angle. As with the arrangement of FIG. 24A, polarisation state 704 sees no net phase difference and is transmitted with maximum luminance. Thus, the retarder 560 introduces no phase shift to polarisation components of light passed by the polariser on the input side of the retarder 560 along an axis along a normal to the plane of the retarder 560. Accordingly, the retarder 560 does not affect the luminance of light passing through the retarder 560 and polarisers (not shown) on each side of the retarder 560.

Figure 24C:
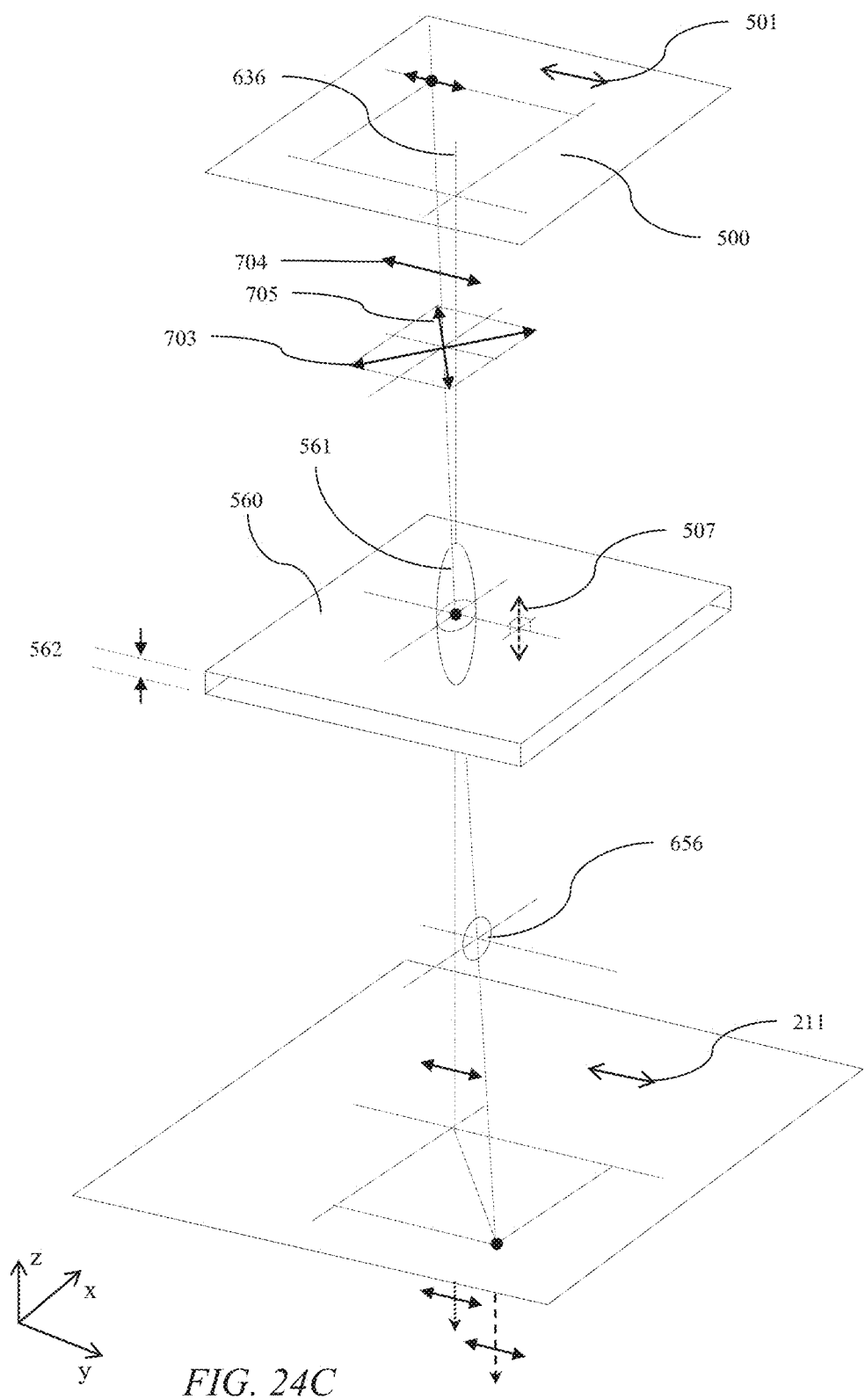
FIG. 24C is a schematic diagram illustrating in perspective view illumination of a C-plate retarder by off-axis polarised light with a positive elevation and negative lateral angle.

FIG. 24C is a schematic diagram illustrating in perspective view illumination of a C-plate layer by off-axis polarised light with a positive elevation and negative lateral angle. In comparison to the arrangement of FIGS. 24A-B, the polarisation state 704 resolves onto eigenstates 703, 705 with respect to the birefringent material 632 providing a net phase difference on transmission through the retarder 560. The resultant elliptical polarisation component 656 is transmitted through polariser 210 with reduced luminance in comparison to the rays illustrated in FIGS. 24A-B.

Figure 24D:
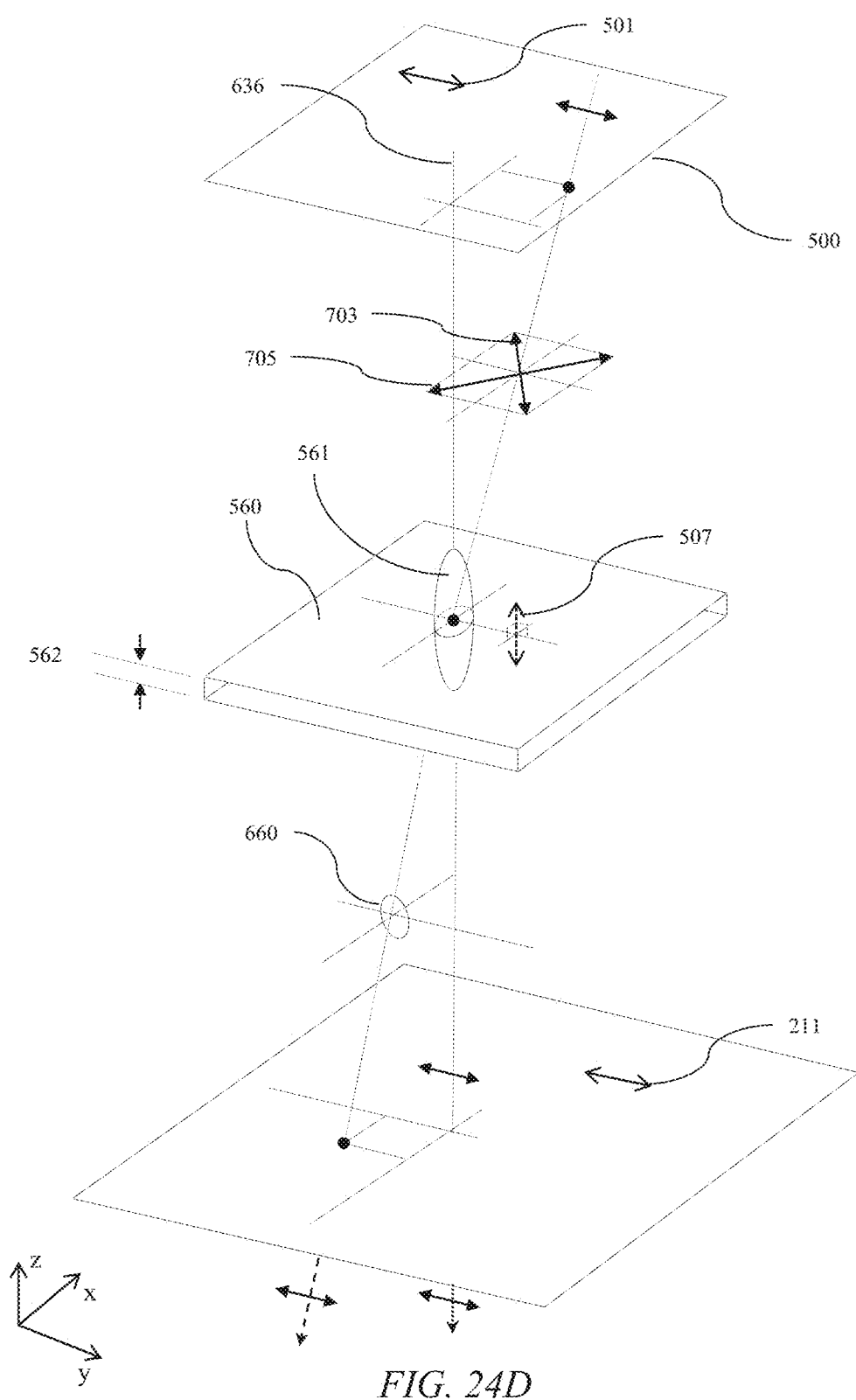
FIG. 24D is a schematic diagram illustrating in perspective view illumination of a C-plate retarder by off-axis polarised light with a positive elevation and positive lateral angle.

FIG. 24D is a schematic diagram illustrating in perspective view illumination of a C-plate layer by off-axis polarised light with a positive elevation and positive lateral angle. In a similar manner to FIG. 24C, the polarisation component 704 is resolved into eigenstates 703, 705 that undergo a net phase difference, and elliptical polarisation component 660 is provided, which after transmission through the polariser reduces the luminance of the respective off-axis ray. Thus, the retarder 560 introduces a phase shift to polarisation components of light passed by the polariser on the input side of the retarder 560 along an axis that is inclined to a normal to the plane of the retarder 560.

Although FIG. 24D relates to the retarder 560 that is passive, a similar effect is achieved by the retarders described above, in a switchable state of the switchable liquid crystal retarder corresponding to the privacy mode.

Figure 25:
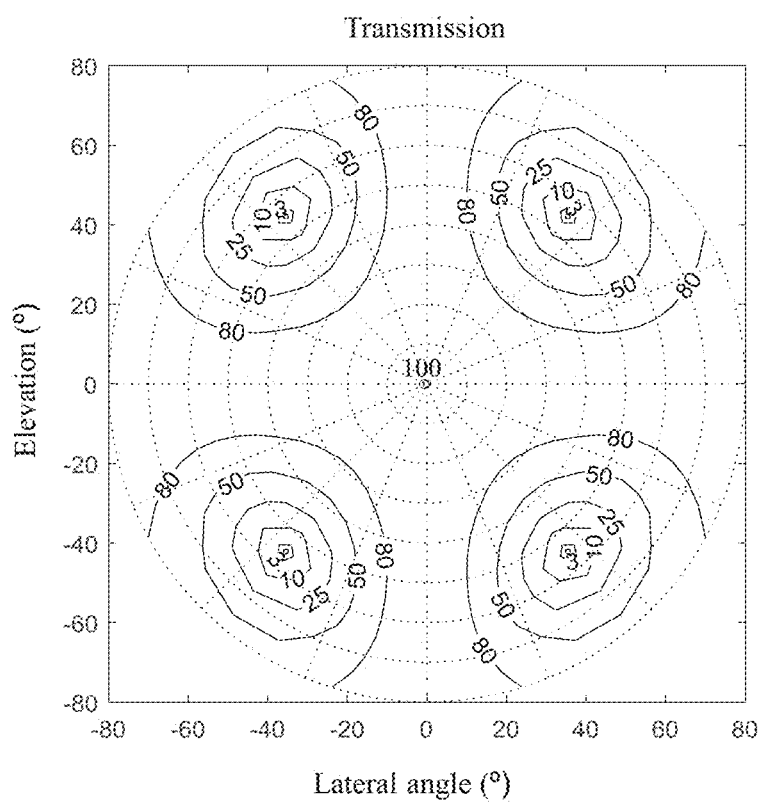
FIG. 25 is a schematic graph illustrating the variation of output transmission with polar direction for transmitted light rays in FIGS. 24A-D.

FIG. 25 is a schematic graph illustrating the variation of output transmission with polar direction for transmitted light rays in FIGS. 24A-D. Thus, the C-plate may provide luminance reduction in polar quadrants. In combination with switchable liquid crystal retarder layer 314 described elsewhere herein, (i) removal of luminance reduction of the C-plate may be provided in a first wide angle state of operation (ii) extended polar region for luminance reduction may be achieved in a second privacy state of operation.

To illustrate the off-axis behaviour of retarder stacks, the angular luminance control of crossed A-plates 308A, 308B between an additional polariser 318 and output display polariser 218 will now be described for various off-axis illumination arrangements.

Figure 26A:
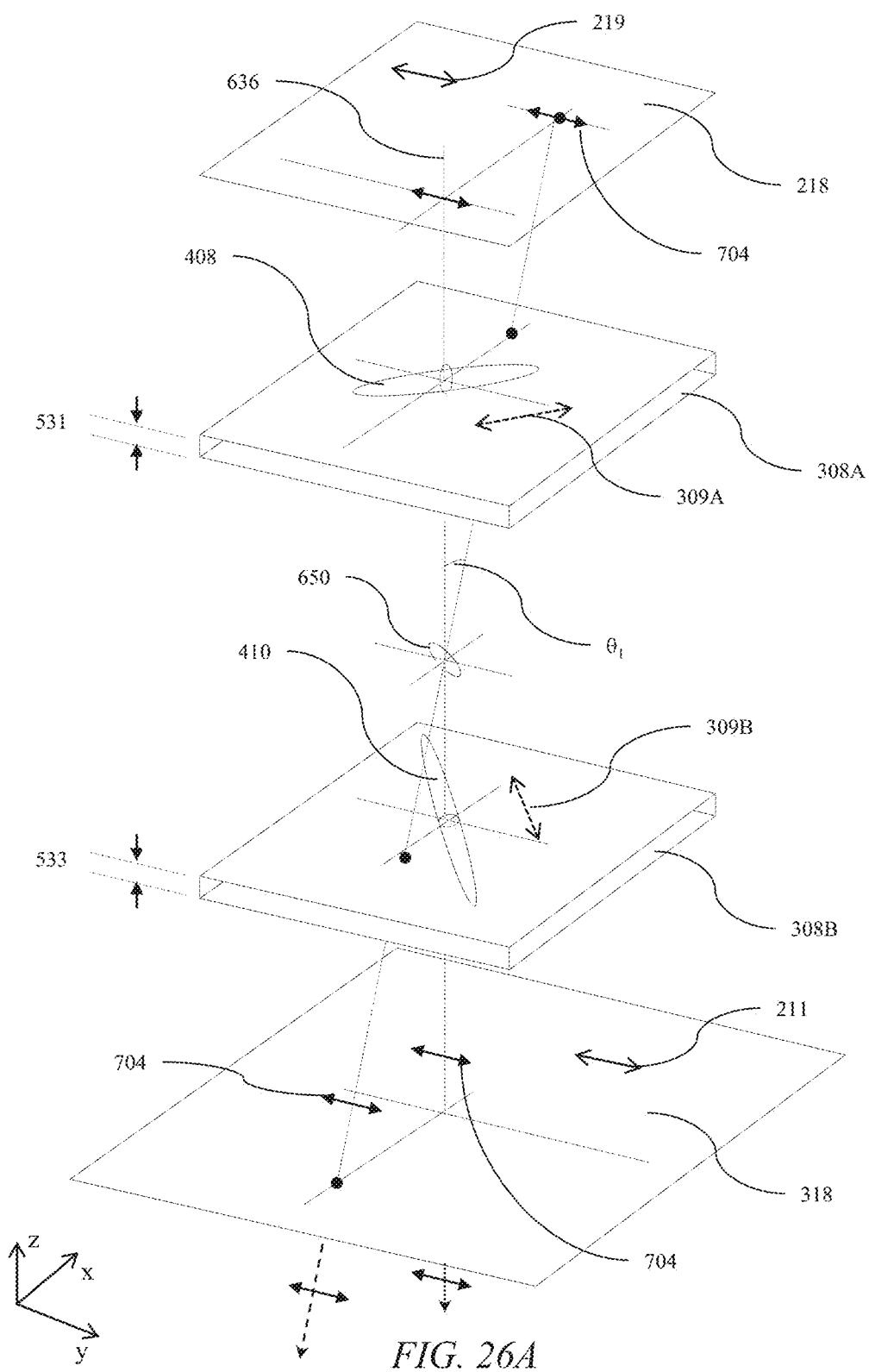
FIG. 26A is a schematic diagram illustrating in perspective view illumination of crossed A-plate retarder layers by off-axis polarised light with a positive elevation.

FIG. 26A is a schematic diagram illustrating in perspective view illumination of crossed A-plate retarder layers by off-axis polarised light with a positive elevation. Linear polariser 218 with electric vector transmission direction 219 is used to provide a linear polarisation state 704 that is parallel to the lateral direction onto first A-plate 308A of the crossed A-plates 308A, 308B. The optical axis direction 309A is inclined at +45 degrees to the lateral direction. The retardance of the retarder 308A for the off-axis angle $\theta_1$ in the positive elevation direction provides a resultant polarisation component 650 that is generally elliptical on output. Polarisation component 650 is incident onto the second A-plate 308B of the crossed A-plates 308A, 308B that has an optical axis direction 309B that is orthogonal to the optical axis direction 309A of the first A-plate 308A. In the plane of incidence of FIG. 26A, the retardance of the second A-plate 308B for the off-axis angle $\theta_1$ is equal and opposite to the retardance of the first A-plate 308A. Thus a net zero retardation is provided for the incident polarisation component 704 and the output polarisation component is the same as the input polarisation component 704.

The output polarisation component is aligned to the electric vector transmission direction of the additional polariser 318, and thus is transmitted efficiently. Advantageously substantially no losses are provided for light rays that have zero lateral angle angular component so that full transmission efficiency is achieved.

Figure 26B:
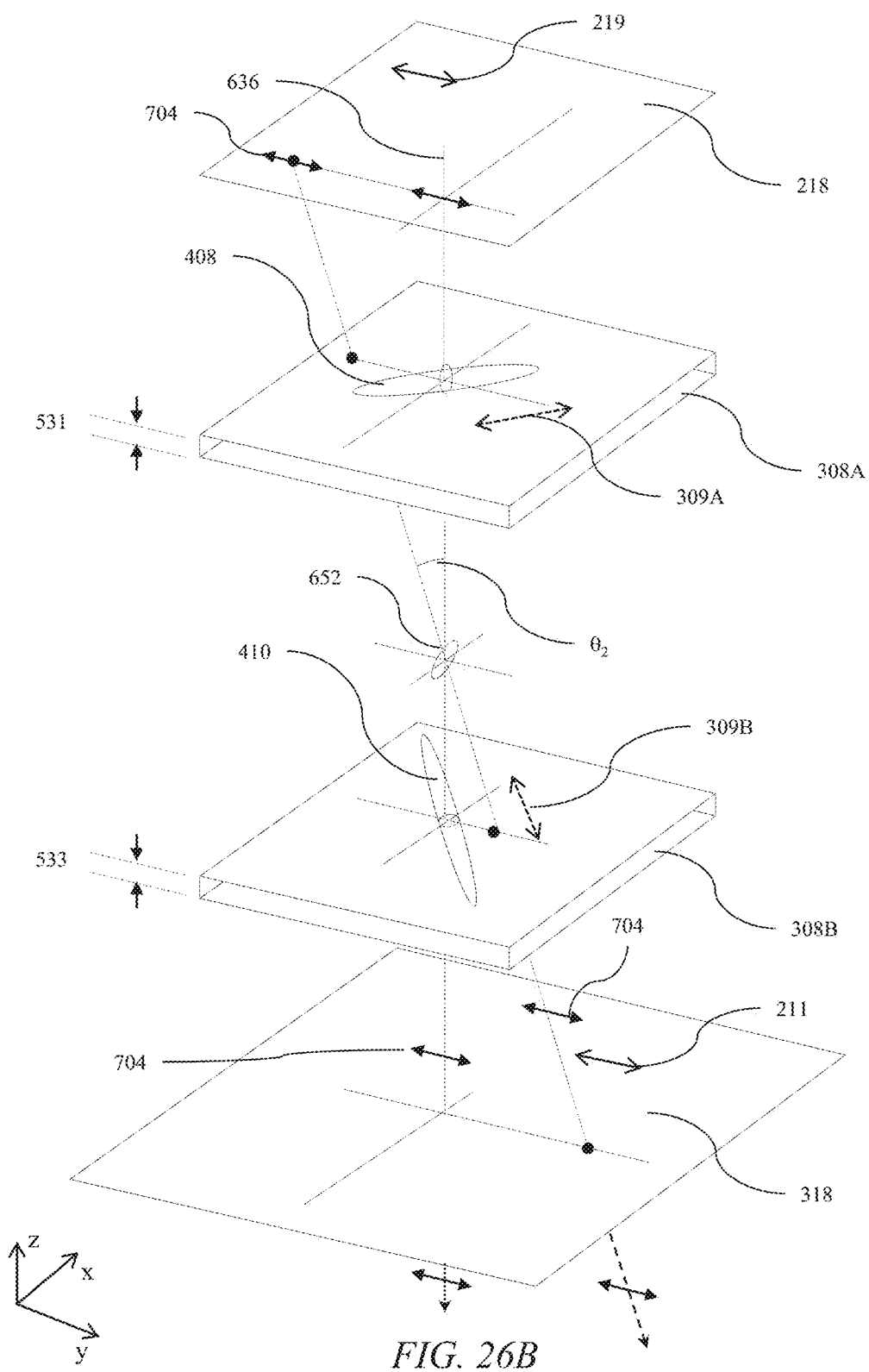
FIG. 26B is a schematic diagram illustrating in perspective view illumination of crossed A-plate retarder layers by off-axis polarised light with a negative lateral angle.

FIG. 26B is a schematic diagram illustrating in perspective view illumination of crossed A-plate retarder layers by off-axis polarised light with a negative lateral angle. Thus input polarisation component is converted by the first A-plate 308A to an intermediate polarisation component 652 that is generally an elliptical polarisation state. The second A-plate 308B again provides an equal and opposite retardation to the first A-plate so that the output polarisation component is the same as the input polarisation component 704 and light is efficiently transmitted through the polariser 318.

Thus the retarder comprises a pair of retarders 308A, 308B which have optical axes in the plane of the retarders 308A, 308B that are crossed, that is the x-y plane in the present embodiments. The pair of retarders 308A, 308B have optical axes 309A, 309B that each extend at 45° with respect to an electric vector transmission direction that is parallel to the electric vector transmission of the polariser 318.

Advantageously substantially no losses are provided for light rays that have zero elevation angular component so that full transmission efficiency is achieved.

Figure 26C:
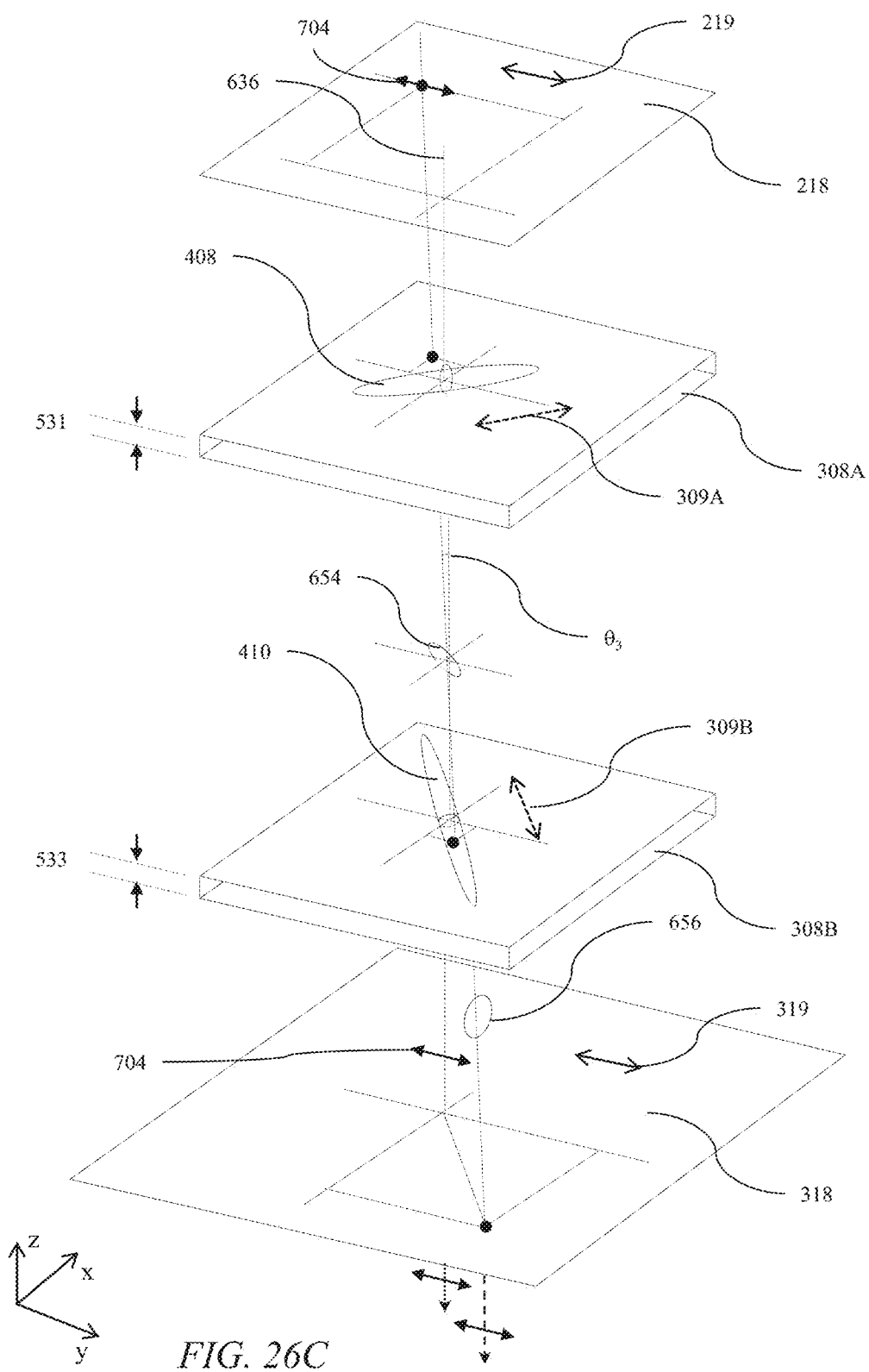
FIG. 26C is a schematic diagram illustrating in perspective view illumination of crossed A-plate retarder layers by off-axis polarised light with a positive elevation and negative lateral angle.

FIG. 26C is a schematic diagram illustrating in perspective view illumination of crossed A-plate retarder layers by off-axis polarised light with a positive elevation and negative lateral angle. Polarisation component 704 is converted to an elliptical polarisation component 654 by first A-plate 308A. A resultant elliptical component 656 is output from the second A-plate 308B. Elliptical component 656 is analysed by input polariser 218 with reduced luminance in comparison to the input luminance of the first polarisation component 704.

Figure 26D:
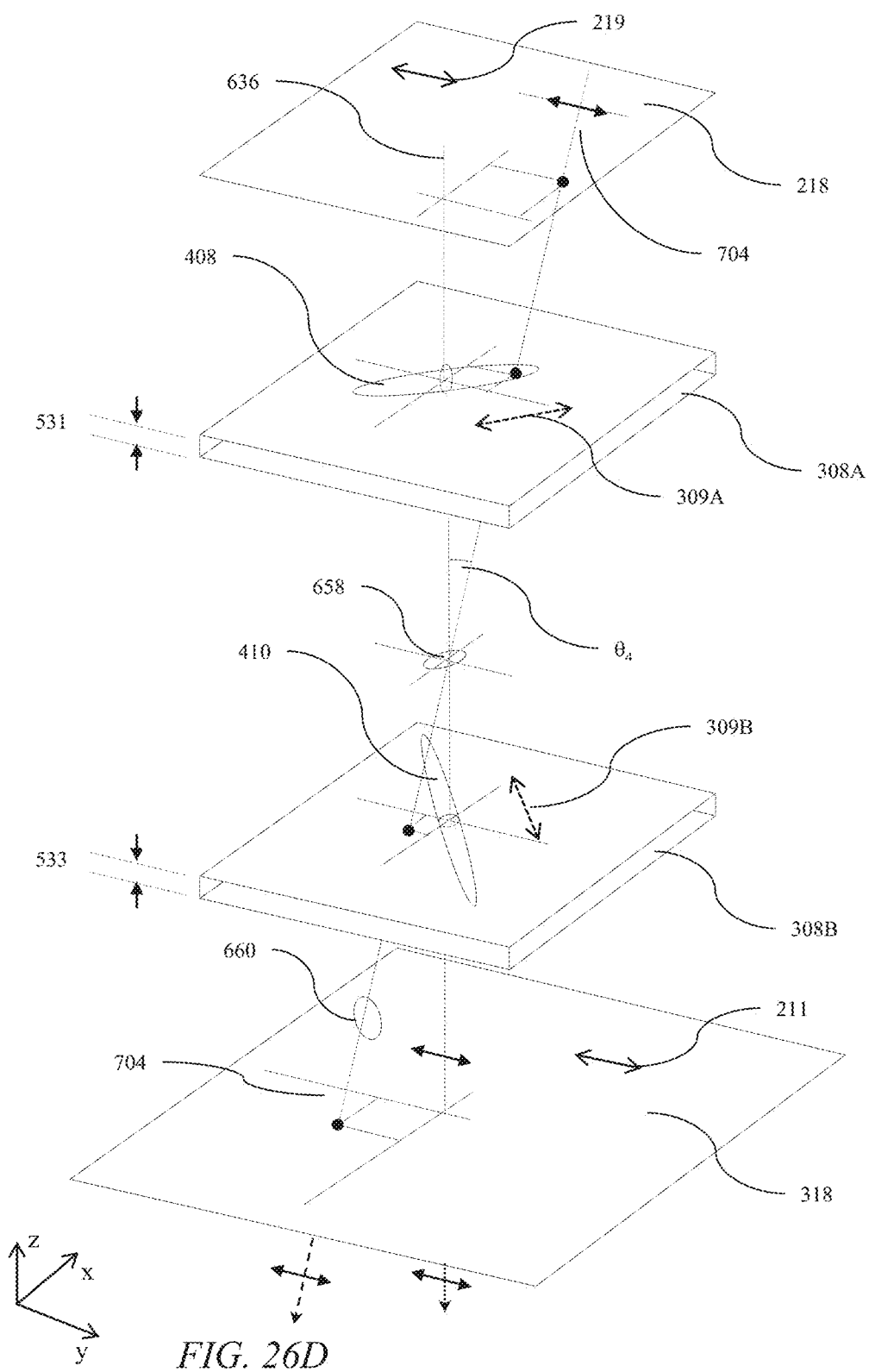
FIG. 26D is a schematic diagram illustrating in perspective view illumination of crossed A-plate retarder layers by off-axis polarised light with a positive elevation and positive lateral angle.

FIG. 26D is a schematic diagram illustrating in perspective view illumination of crossed A-plate retarder layers by off-axis polarised light with a positive elevation and positive lateral angle. Polarisation components 658 and 660 are provided by first and second A-plates 308A, 308B as net retardance of first and second retarders does not provide compensation.

Thus luminance is reduced for light rays that have non-zero lateral angle and non-zero elevation components. Advantageously display privacy can be increased for snoopers that are arranged in viewing quadrants while luminous efficiency for primary display users is not substantially reduced.

Figure 27:
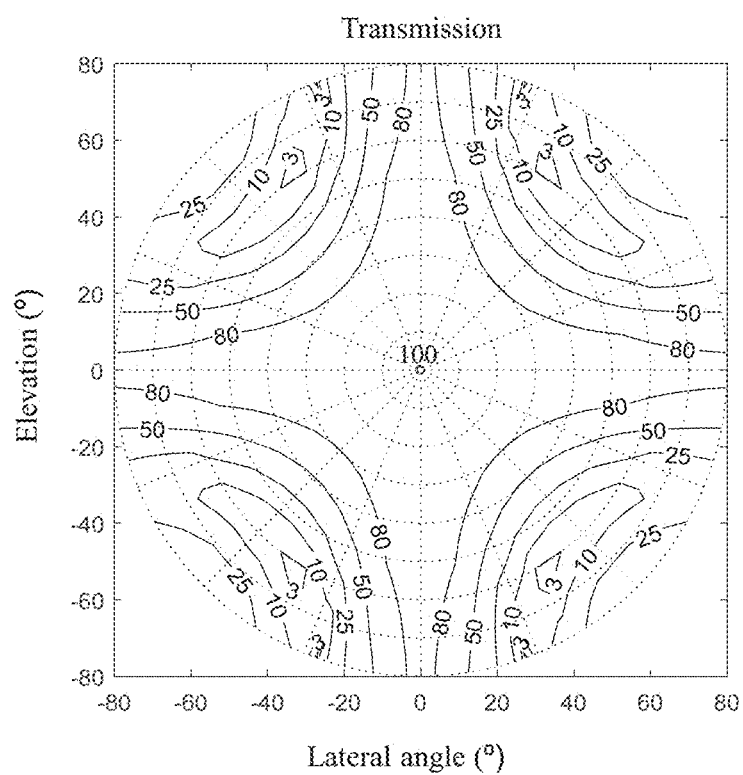
FIG. 27 is a schematic graph illustrating the variation of output transmission with polar direction for transmitted light rays in FIGS. 26A-D.

FIG. 27 is a schematic graph illustrating the variation of output transmission with polar direction for transmitted light rays in FIGS. 26A-D. In comparison to the arrangement of FIG. 25, the area of luminance reduction is increased for off-axis viewing. However, the switchable liquid crystal retarder layer 301 may provide reduced uniformity in comparison to the C-plate arrangements for off-axis viewing in the first wide mode state of operation.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A display device comprising:
    a spatial light modulator comprising a layer of liquid crystal material arranged to output light on an output side;
    an input polariser arranged on an input side of the spatial light modulator;
    an output polariser arranged on the output side of the spatial light modulator; and
    plural retarders arranged between the input polariser and the output polariser on either the input side or the output side of spatial light modulator,
    wherein
    the plural retarders include at least one switchable liquid crystal retarder comprising a layer of liquid crystal material and electrodes arranged to apply a voltage for switching the layer of liquid crystal material, and at least one passive retarder, and
    the plural retarders are arranged to introduce no phase shift to polarisation components of light passed by the input polariser along an axis along a normal to the plane of the retarder and are arranged to introduce a phase shift to polarisation components of light passed by the input polariser along an axis inclined to the axis along a normal to the plane of the retarder in a switchable mode of the at least one switchable liquid crystal retarder.

2. A display device according to claim 1, wherein the switchable liquid crystal retarder comprises two surface alignment layers disposed adjacent to the layer of liquid crystal material and on opposite sides thereof and each arranged to provide homeotropic alignment in the adjacent liquid crystal material.

3. A display device according to claim 2, wherein the liquid crystal material has a negative dielectric anisotropy.

4. A display device according to claim 2, wherein the at least one passive retarder comprises a passive retarder having an optical axis perpendicular to the plane of the passive retarder and having and having a retardance for light of a wavelength of 550 nm in a range from −250 nm to −500 nm.

5. A display device according to claim 1, wherein the switchable liquid crystal retarder comprises two surface alignment layers disposed adjacent to the layer of liquid crystal material and on opposite sides thereof and each arranged to provide homogenous alignment in the adjacent liquid crystal material.

6. A display device according to claim 5, wherein the liquid crystal material has a positive dielectric anisotropy.

7. A display device according to claim 5, wherein the at least one passive retarder comprises a passive retarder having an optical axis perpendicular to the plane of the passive retarder and having and having a retardance for light of a wavelength of 550 nm in a range from −400 nm to −200 nm.

8. A display device according to claim 5, wherein the at least one passive retarder comprises a pair of passive retarders having optical axes parallel to the plane of the passive retarder that are crossed and having a retardance for light of a wavelength of 550 nm in a range from 250 nm to 450 nm.

9. A display device according to claim 5, wherein
    the spatial light modulator comprises a surface alignment layer disposed adjacent to the layer of liquid crystal material on the side closest to the plural retarders that is arranged to provide homogenous alignment in the adjacent liquid crystal material, there being a non-zero angle between the alignment direction of the surface alignment layer of the spatial light modulator and the alignment direction of the surface alignment layer of the switchable liquid crystal retarder on the side closest to the spatial light modulator, and
    the display device further comprises a half waveplate arranged between the spatial light modulator and the switchable liquid crystal retarder and arranged to rotate a polarisation component of light incident thereon by said non-zero angle.

10. A display device according to claim 9, wherein the at least one passive retarder comprises a passive retarder having an optical axis perpendicular to the plane of the passive retarder and having and having a retardance for light of a wavelength of 550 nm in a range from −400 nm to −200 nm.

11. A display device according to claim 1, wherein the at least one passive retarder comprises a pair of passive retarders having optical axes parallel to the plane of the passive retarder that are crossed.

12. A display device according to claim 11, wherein the pair of passive retarders have optical axes that extend at 45° and at 135°, respectively, with respect to an electric vector transmission direction of the input polariser or the output polariser.

13. A display device according to claim 1, wherein the at least one passive retarder comprises a passive retarder having an optical axis perpendicular to the plane of the passive retarder.

14. A display device according to claim 1, wherein the spatial light modulator is transmissive and the display device further comprises a backlight on the input side of the input polariser.

15. A display device according to claim 14, wherein the backlight provides a luminance at lateral angles greater than 45 degrees, that is at most 20% of the luminance in a direction normal to the display surface.

16. A display device according to claim 14, wherein the spatial light modulator is one of an in-plane switching device, a twisted nematic device or a fringe field switching device.

17. A display device according to claim 1, further comprising
- an additional polariser arranged on the input side of the input polariser or on the output side of the output polariser; and
- at least one retarder arranged between the input polariser and the additional polariser in the case the additional polariser is arranged on the input side of the input polariser; or at least one retarder arranged between the output polariser and the additional polariser in the case the additional polariser is arranged on the output side of the output polariser.

18. A display device according to claim 17 wherein the at least one retarder comprises a switchable liquid crystal retarder comprising a layer of liquid crystal material.

19. A display device according to claim 18 further comprising at least one passive compensation retarder.

20. A display device according to claim 17, wherein the additional polariser is on the output side of the output polariser and further comprising a reflective polariser arranged between the output polariser and the at least one retarder.

* * * * *